United States Patent
Yajima

(10) Patent No.: US 9,110,586 B2
(45) Date of Patent: Aug. 18, 2015

(54) SCROLLING APPARATUS, SCROLLING METHOD, NON-TRANSITORY COMPUTER READABLE RECORDING MEDIUM AND INTERGRATED CIRCUIT

(75) Inventor: Hideaki Yajima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 239 days.

(21) Appl. No.: 13/388,525

(22) PCT Filed: May 26, 2011

(86) PCT No.: PCT/JP2011/002936
§ 371 (c)(1),
(2), (4) Date: Feb. 2, 2012

(87) PCT Pub. No.: WO2011/152001
PCT Pub. Date: Dec. 8, 2011

(65) Prior Publication Data
US 2012/0127209 A1    May 24, 2012

(30) Foreign Application Priority Data
Jun. 3, 2010   (JP) .................................. 2010-128114

(51) Int. Cl.
*G09G 5/00*   (2006.01)
*G06F 3/0488*   (2013.01)
(Continued)

(52) U.S. Cl.
CPC .......... *G06F 3/04883* (2013.01); *G06F 3/0485* (2013.01); *G09G 5/397* (2013.01); *G09G 2320/0252* (2013.01); *G09G 2330/021* (2013.01)

(58) Field of Classification Search
CPC .......... G06F 12/0246; G06F 17/30867; G06F 17/30; G06F 9/455; G06F 11/2084; G06F 12/02; G06F 3/0485; G06F 3/017; G06F 3/04855; G06Q 10/10; G06Q 20/3229; G06Q 30/0244; A61B 17/025; A61B 2017/00221
USPC .......................................................... 345/684
See application file for complete search history.

(56) References Cited

U.S. PATENT DOCUMENTS

| | | | |
|---|---|---|---|
| 8,271,898 B1 * | 9/2012 | Mattos et al. ................. | 715/784 |
| 2006/0082600 A1 * | 4/2006 | Odagawa ...................... | 345/684 |

(Continued)

FOREIGN PATENT DOCUMENTS

| | | |
|---|---|---|
| JP | 11-88866 | 3/1999 |
| JP | 2000-47658 | 2/2000 |

(Continued)

OTHER PUBLICATIONS

International Search Report issued Aug. 9, 2011 in International (PCT) Application No. PCT/JP2011/002936.

*Primary Examiner* — Mark Zimmerman
*Assistant Examiner* — F. M. Hossain
(74) *Attorney, Agent, or Firm* — Wenderoth, Lind & Ponack, L.L.P.

(57) ABSTRACT

A scrolling apparatus enables scrolling of display contents of a display unit and includes a load range determining unit that determines a load range of display data to be loaded from a primary storage unit to a secondary storage unit according to a movement starting position detected by a detecting unit; a loading unit that loads display data in the load range determined by the load range determining unit from the primary storage unit to the secondary storage unit; and a display control unit that displays on the display unit display data in a display range among the display data in the load range stored in the secondary storage unit.

11 Claims, 11 Drawing Sheets

(51) Int. Cl.
  *G06F 3/0485*  (2013.01)
  *G09G 5/397*  (2006.01)

(56) References Cited

U.S. PATENT DOCUMENTS

2009/0128484 A1* 5/2009 Hanyu ........................ 345/156
2010/0122206 A1* 5/2010 Matsue et al. ............... 715/785
2010/0134425 A1* 6/2010 Storrusten .................. 345/173
2010/0302283 A1  12/2010 Sasaki et al.
2012/0293559 A1* 11/2012 Tomaru et al. .............. 345/684

FOREIGN PATENT DOCUMENTS

JP  2009-140119  6/2009
JP  2009-169493  7/2009

* cited by examiner

SCROLLING APPARATUS, SCROLLING METHOD, NON-TRANSITORY COMPUTER READABLE RECORDING MEDIUM AND INTERGRATED CIRCUIT

BACKGROUND OF THE INVENTION

1. Technical Field

The present invention relates to a technique that enables scrolling of display contents of a display unit and, in particular, to a scrolling apparatus, a scrolling method, a scrolling program, and an integrated circuit which enable high-speed scrolling using a pointing device such as a touch panel.

2. Background Art

An exemplary conventional scrolling apparatus is provided with a memory buffer capable of storing display data in a greater range than a display range of a display unit, and increases processing speed during scrolling by loading, in advance, display data existing in a scrollable direction prior to performing a scroll operation to the memory buffer (for example, refer to Patent Document 1). FIGS. 12A to 12C are diagrams showing an example of display data loaded to a memory buffer according to Patent Document 1 described above. Prior to initial display, first, when a display range 500 is specified as an initial display area, display data arranged in the display range 500 shown in FIG. 12A is saved in a memory buffer. Subsequently, display data included in the display range 500 is displayed on a display unit to perform initial display. Next, as a prior loading process of a scroll operation, for example, if there is a possibility of scrolling being respectively performed by a maximum of one screen in upward, downward, leftward, and rightward directions, display data that is arranged in an area 501 which is an area created by expanding the display range 500 by a maximum of one screen in upward, downward, leftward, and rightward directions is stored in the memory buffer.

Next, when scrolling display, a scrolling direction is determined according to a movement position during a slide operation performed by a user. FIG. 12B shows contents of the memory buffer when scrolling is performed by one screen in the rightward direction. When scrolling toward the right, according to a movement position during a slide operation, a range displayed on the display unit is moved from the display range 500 in FIG. 12A to the display range 500 in FIG. 12B, and display contents are scrolled by continuously displaying display data included in the display range on the display unit. Finally, when the display range 500 is modified, display data corresponding to an area 502 (FIG. 12C) not yet stored in the memory buffer among areas having a possibility of being displayed on the display unit when scrolling is performed once again is stored in the memory buffer according to the modified display range 500.

By storing, before a scroll operation is performed by the user, display data having a possibility of being displayed on the display unit due to scrolling in the memory buffer in the sequence described above, processes of reading and loading display data to the memory buffer after a scroll operation is performed by the user and before a screen after scrolling is displayed on the display unit is eliminated to achieve high-speed scrolling.

However, with the conventional configuration described above, since display data in all areas having a possibility of being displayed due to a scroll operation by the user is loaded in advance, a significant amount of display data is loaded. Consequently, there is a problem of increased load processing time of display data and increased memory consumption for storing loaded display data.

Patent Document 1: Japanese Patent Application Laid-open No. 2000-47658

SUMMARY OF THE INVENTION

The present invention solves the conventional problem described above, and an object thereof is to provide a scrolling apparatus, a scrolling method, a scrolling program, and an integrated circuit which enable high-speed scrolling while suppressing load processing time of display data and memory consumption for storing loaded display data by reducing the amount of display data to be loaded.

A scrolling apparatus according to an aspect of the present invention is a scrolling apparatus that enables scrolling of display contents of a display unit, the scrolling apparatus comprising: a detecting unit that detects a movement starting position specified by a user in an operating range having a position that is specifiable by the user; a primary storage unit that stores display data; a secondary storage unit that stores the display data in a load range that is larger than a display range of the display unit among the display data stored in the primary storage unit; a load range determining unit that determines the load range of the display data to be loaded from the primary storage unit to the secondary storage unit according to the movement starting position detected by the detecting unit; a loading unit that loads the display data in the load range determined by the load range determining unit from the primary storage unit to the secondary storage unit; and a display control unit that displays on the display unit display data in the display range among the display data in the load range stored in the secondary storage unit.

DETAILED DESCRIPTION OF THE INVENTION

Hereinafter, embodiments of the present invention will be described with reference to the drawings.

First Embodiment

Figure 1:
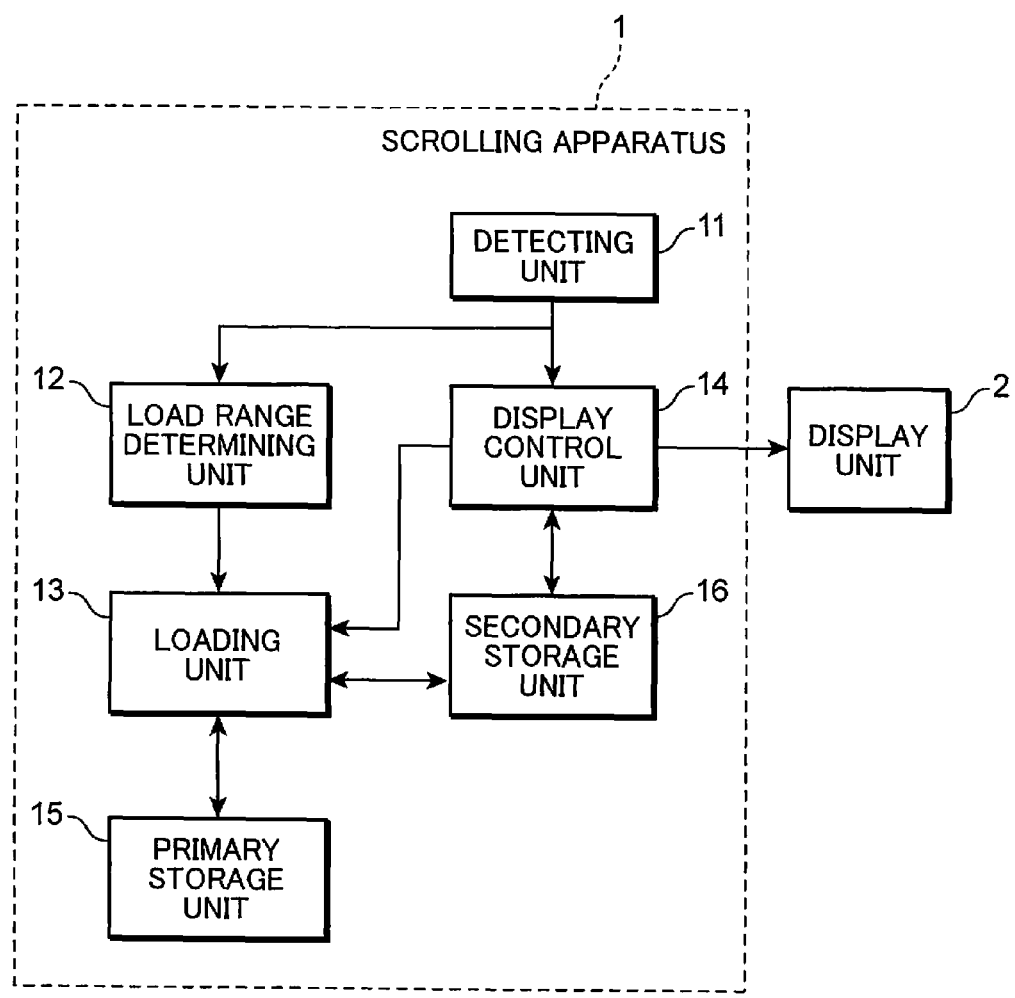
FIG. 1 is a block diagram showing a configuration of a scrolling apparatus according to a first embodiment of the present invention.

FIG. 1 is a block diagram showing a configuration of a scrolling apparatus 1 according to a first embodiment of the present invention. The scrolling apparatus 1 controls display contents on a display unit 2 and comprises a detecting unit 11, a load range determining unit 12, a loading unit 13, a display control unit 14, a primary storage unit 15, and a secondary storage unit 16. The display unit 2 is a CRT, an LCD, or the like which displays a screen.

The detecting unit 11 comprising a pointing device such as a touch pad or a touch panel (in the present first embodiment, a touch panel) accepts and detects a user operation, and notifies a result of the operation to the load range determining unit 12 and the display control unit 14. More specifically, the detecting unit 11 notifies a starting position of a slide operation, a movement position during the slide operation, and an end position of the slide operation. In the case of the touch panel according to the present first embodiment, the detecting unit 11 notifies a position at which a finger of the user touches the touch panel, a position to which the finger moves after coming into contact with the touch panel, and a position at which the finger breaks contact with the touch panel.

The primary storage unit 15 is an HD (Hard Disk), a DVD (Digital Versatile Disk), or the like for saving data, and saves display data such as images. Moreover, while the present configuration represents an example in which the primary storage unit 15 is coupled directly, the primary storage unit 15 may alternatively be connected via a network such as the Internet.

When a starting position of a slide operation is notified from the detecting unit 11, according to the notified starting position, the load range determining unit 12 determines a load range indicating whichever area of the primary storage unit 15 in which display data to be loaded to the secondary storage unit 16 is arranged. In addition, the load range determining unit 12 judges display data arranged in a direction having a greatest difference between a present display range and the load range among display data arranged in the load range to have a high priority. Details of these functions will be described later.

The loading unit 13 acquires display data from the primary storage unit 15 and stores the display data in the secondary storage unit 16, and acquires display data in a range displayed by the display control unit 14 from the primary storage unit 15 and stores the display data in the secondary storage unit 16. In addition, the loading unit 13 sequentially acquires display data in the load range determined by the load range determining unit 12 from the primary storage unit 15 in a descending order from the display data having a high priority as judged by the load range determining unit 12, and stores the display data in the secondary storage unit 16.

The display control unit 14 determines which part of the data among the data stored in the secondary storage unit 16 is to be displayed on the display unit 2, and enables scrolling of display contents of the display unit 2 according to user operation contents received from the detecting unit 11. More specifically, when the user performs an operation involving sliding a finger on the touch panel and a movement position of the finger during the slide operation is notified from the detecting unit 11, the display control unit 14 scrolls display contents of the display unit 2 by a same amount as a movement distance from a starting position of the slide operation to the notified movement position during the slide operation.

The secondary storage unit 16 is a frame buffer or the like that stores display data and comprises a flash memory or the like which can be accessed at a higher rate than the primary storage unit 15. Display data is stored in the secondary storage unit 16 in a same format as a layout displayed on the display unit 2.

Figure 2:
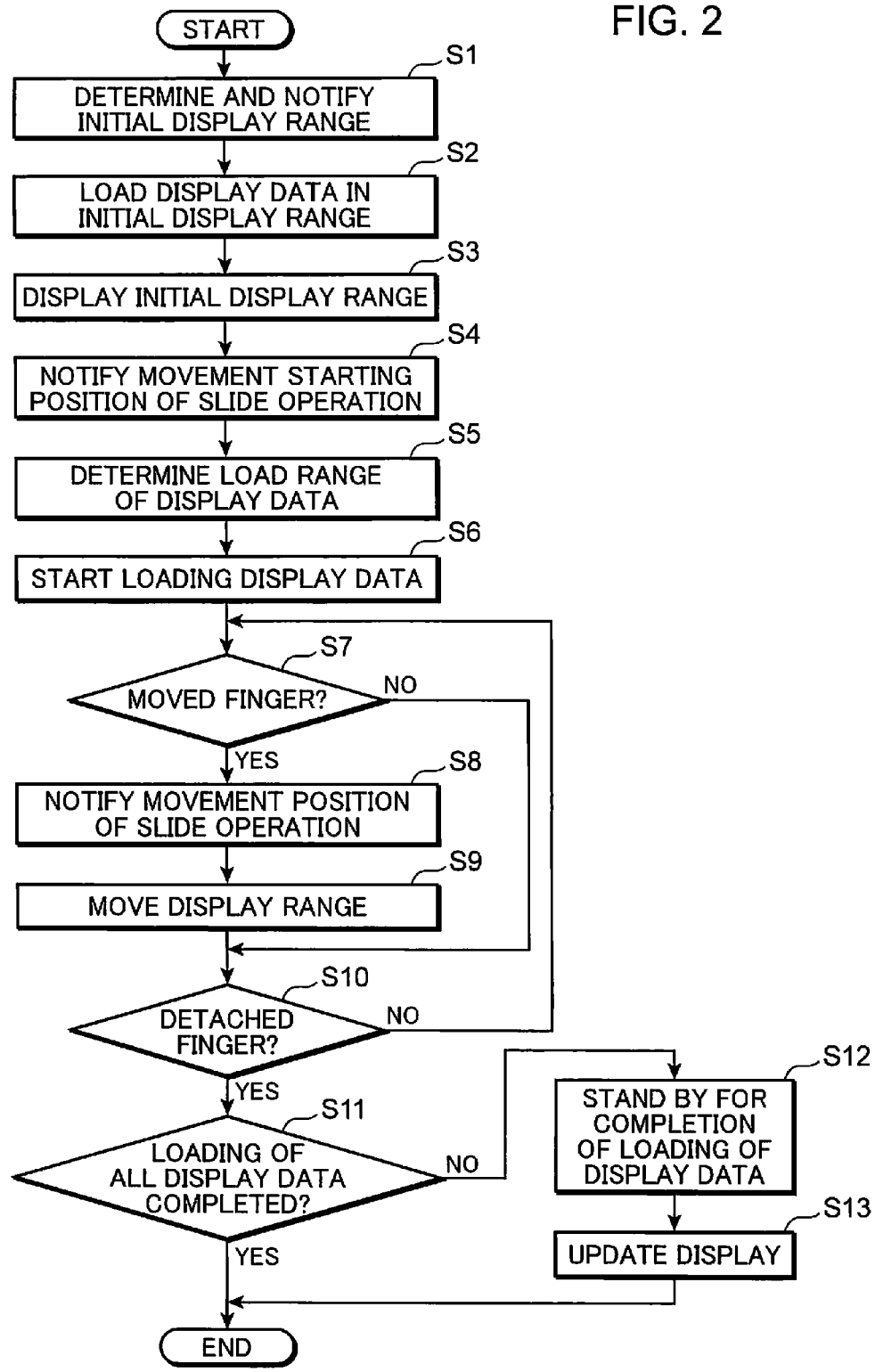
FIG. 2 is a flow chart showing a flow of processes from an initial display on a display unit to scrolling of display contents according to the first embodiment of the present invention.
Figure 3A:
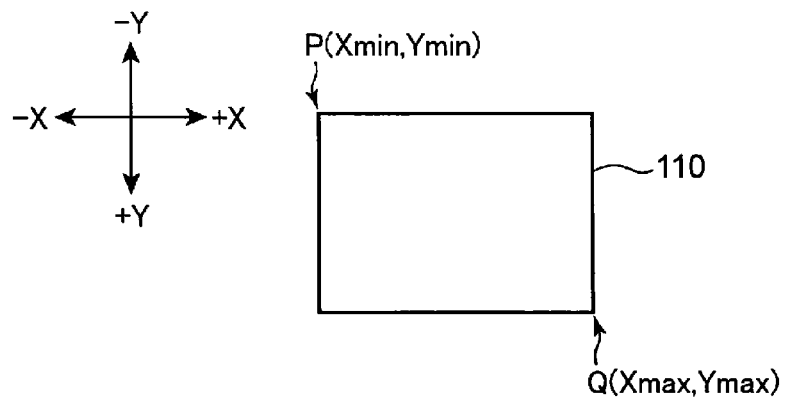
FIGS. 3A to 3C are diagrams showing a contact position of a finger on a touch panel.
Figure 3B:
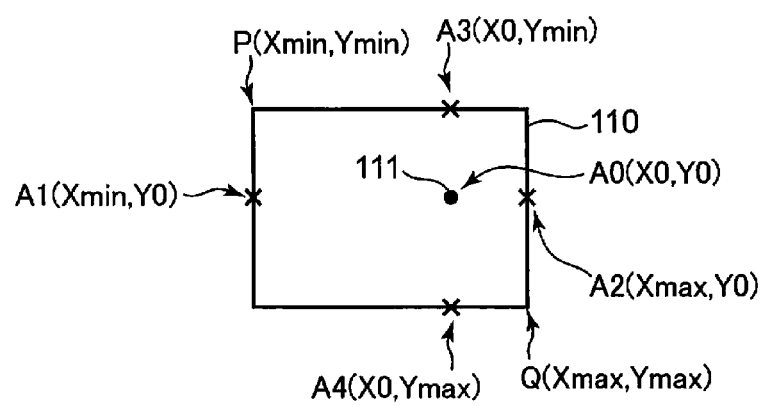
Figure 3C:
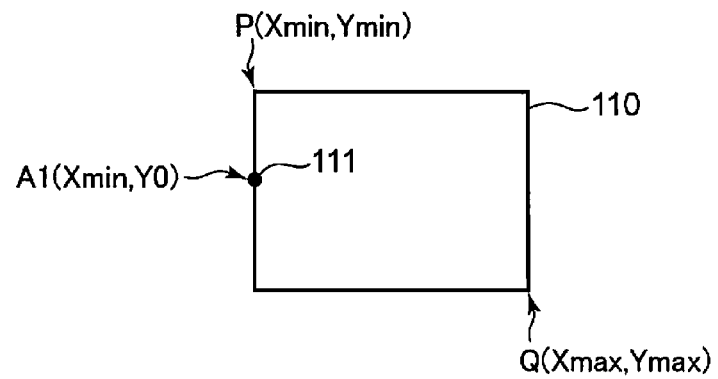
Figure 4A:
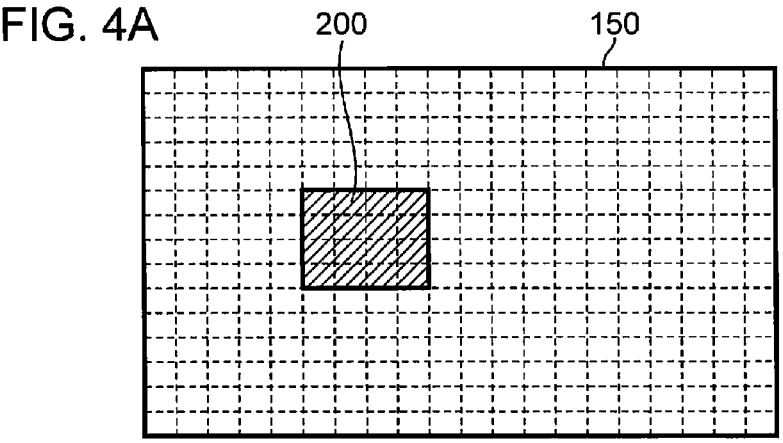
FIGS. 4A to 4C are diagrams showing a load range and a display range.
Figure 4B:
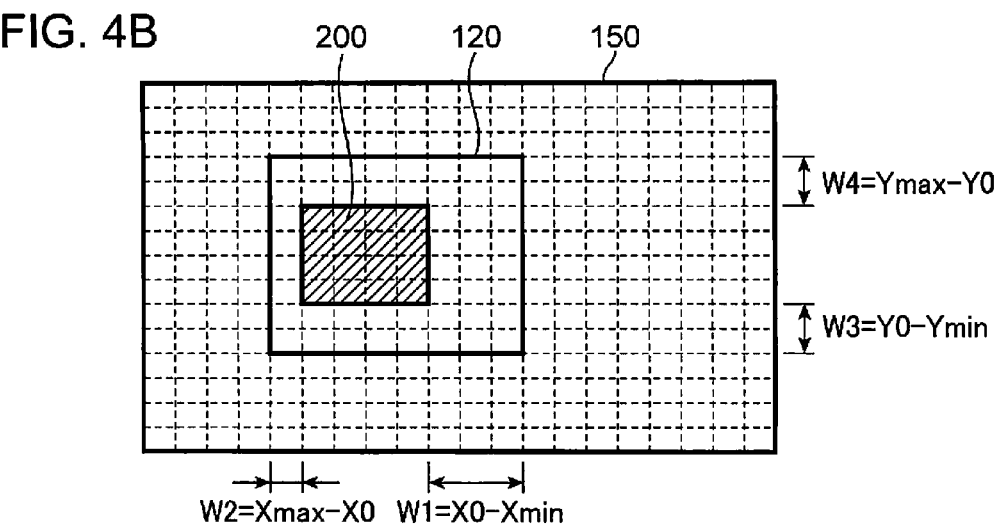
Figure 4C:
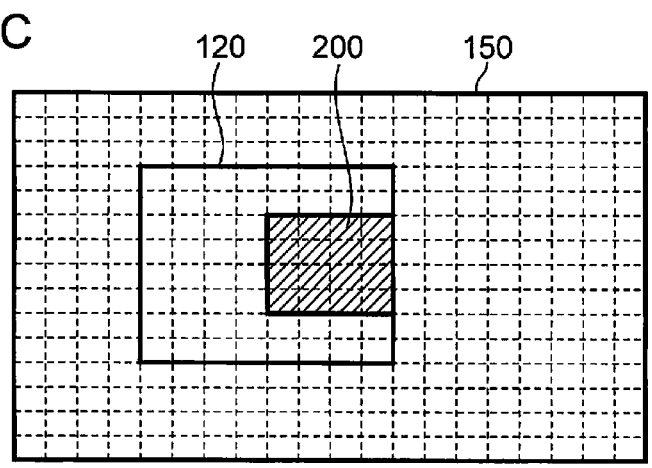
Figure 5:
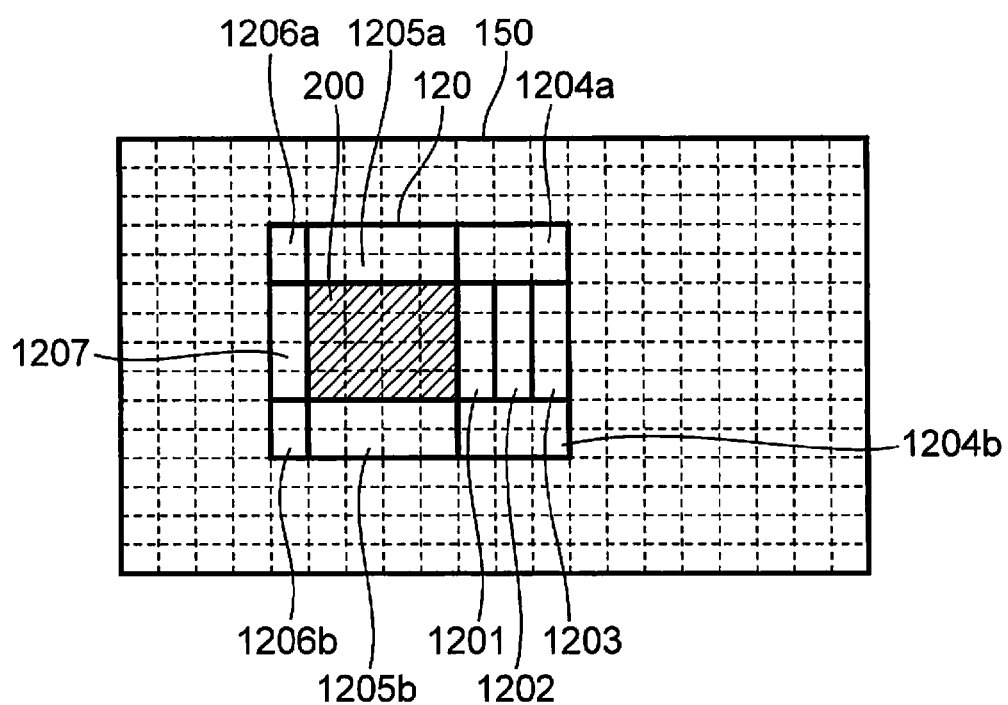
FIG. 5 is a diagram describing a load priority judged by a load range determining unit.

FIG. 2 is a flow chart showing a flow of processes from initial display to performing scrolling, FIGS. 3A to 3C are diagrams showing a contact position of a finger on the touch panel, FIGS. 4A to 4C are diagrams showing an example of a load range determined by the load range determining unit 12, and FIG. 5 is a diagram describing a load priority judged by the load range determining unit 12. FIGS. 3A, 3B, and 3C are diagrams showing a contact point between the touch panel and a finger upon initial display, upon start of a slide operation, and upon end of the slide operation, respectively. FIGS. 4A, 4B, and 4C are diagrams showing contents of the secondary storage unit 16 and a load range determined by the load range determining unit 12 upon initial display, upon start of a slide operation, and upon end of the slide operation, respectively. FIGS. 3A to 3C show an operating range 110 to which an input can be made via the touch panel, and a contact position 111 between the touch panel and a finger.

As shown in FIG. 3A, the operating range 110 of the touch panel has a rectangular shape which has coordinates P (Xmin, Ymin) as an upper-left corner thereof, which extends in a +X direction (a rightward direction in FIG. 3) by Xmax and in a +Y direction (a downward direction in FIG. 3) by Ymax, and which has coordinates Q (Xmax, Ymax) as a lower-right corner thereof. Moreover, in the present example, for the sake of simplicity, it is assumed that a coordinate range that can be inputted using the touch panel of the detecting unit 11 and a coordinate range that can be displayed on the display unit 2 are consistent with each other.

In FIG. 4A, an area 150 is an area used by the secondary storage unit 16 to store display data. Display data is stored in this area in conformity with a layout in which the display control unit 14 displays the display data on the display unit 2. Moreover, the area 150 is a virtual area and all of a storage area such as a physical memory for actually storing display data need not necessarily be secured at this point. Instead, when storing of display data actually becomes necessary, a storage area corresponding to the area may be secured.

First, as shown in FIG. 4A, the display control unit 14 determines a display range 200 in which initial display is performed and notifies the same to the loading unit 13 (step S1). This can be performed by displaying a fixed area set in advance by a system (for example, a first image among a plurality of images) or by having the user specify an area upon performing initial display.

Next, the loading unit 13 acquires display data to be arranged in the display range 200 that is initially displayed from the primary storage unit 15 and stores the display data in the secondary storage unit 16 (step S2). Moreover, since a slide operation for performing scrolling has not yet been performed at this stage, a finger is not in contact with the touch panel as shown in FIG. 3A.

Upon receiving a display data storage request from the loading unit 13, the secondary storage unit 16 secures a physical memory area necessary for storing the display data and stores the display data. Subsequently, initial display is performed as the display control unit 14 displays the display data included in the display range 200 of the secondary storage unit 16 on the display unit 2 (step S3).

Next, when the user touches the touch panel of the detecting unit 11 with a finger to start a slide operation, the detecting unit 11 notifies a slide starting position to the load range determining unit 12 (step S4).

Subsequently, based on the notified slide starting position, the load range determining unit 12 determines a load range 120 of the display data (step S5). Specifically, as shown in FIG. 3B, assuming that X coordinates that can be operated via the touch panel of the detecting unit 11 range from Xmin to Xmax and Y coordinates range from Ymin to Ymax, and a starting position of the slide operation is A0 (X0, Y0), then the load range determining unit 12 predicts that scrolling may possibly be performed up to a movement distance described below as a scrollable range.

That is, the load range determining unit 12 predicts that scrolling in a rightward direction (+X direction) may possibly be performed up to coordinates A1 (Xmin, Y0) which is a movement end position to which a scroll operation can be performed in the rightward direction from the slide starting position A0 (X0, Y0) and which is a position having a maximum distance from the slide starting position A0 (X0, Y0). In addition, the load range determining unit 12 predicts that scrolling in a leftward direction (−X direction) may possibly be performed up to coordinates A2 (Xmax, Y0) which is a movement end position to which a scroll operation can be performed in the leftward direction from the slide starting position A0 (X0, Y0) and which is a position having a maximum distance from the slide starting position A0 (X0, Y0).

Furthermore, the load range determining unit 12 predicts that scrolling in a downward direction (+Y direction) may possibly be performed up to coordinates A3 (X0, Ymin) which is a movement end position to which a scroll operation can be performed in the downward direction from the slide starting position A0 (X0, Y0) and which is a position having a maximum distance from the slide starting position A0 (X0, Y0). Moreover, the load range determining unit 12 predicts that scrolling in an upward direction (−Y direction) may possibly be performed up to coordinates A4 (X0, Ymax) which is a movement end position to which a scroll operation can be performed in the upward direction from the slide starting position A0 (X0, Y0) and which is a position having a maximum distance from the slide starting position A0 (X0, Y0).

In other words, as a scrollable range, the load range determining unit 12 predicts that scrolling may respectively possibly be performed in the rightward direction by a movement distance (a distance between the coordinates A0 and the coordinates A1) expressed by W1=(X0−Xmin), in the leftward direction by a movement distance (a distance between the coordinates A0 and the coordinates A2) expressed by W2=(Xmax−X0), in the downward direction by a movement distance (a distance between the coordinates A0 and the coordinates A3) expressed by W3=(Y0−Ymin), and in the upward direction by a movement distance (a distance between the coordinates A0 and the coordinates A4) expressed by W4=(Ymax−Y0).

Consequently, as shown in FIG. 4B, the load range determining unit 12 determines a range created by respectively expanding a right end of the display range 200 in the rightward direction by a width of W1=(X0−Xmin), a left end of the display range 200 in the leftward direction by a width of W2=(Xmax−X0), a lower end of the display range 200 in the downward direction by a width of W3=(Y0−Ymin), and an upper end of the display range 200 in the upward direction by a width of W4=(Ymax−Y0) as the load range 120.

In doing so, the load range determining unit 12 judges display data arranged in a direction having a greatest difference between the present display range 200 and the load range 120 among display data to be arranged in the load range 120 to have a high priority. In other words, while the load range 120 is determined as a range created by expanding the display range 200 in the respective directions by the respective widths described above, the load range determining unit 12 judges display data arranged in a direction corresponding to a maximum width among the widths described above to have a high priority.

Specifically, the load range determining unit 12 compares the four values of a rightward-direction difference W1=(X0−Xmin), a leftward-direction difference W2=(Xmax−X0), a downward-direction difference W3=(Y0−Ymin), and an upward-direction difference W4=(Ymax−Y0), and determines a greatest value. As shown in FIG. 4B, the rightward-direction difference W1=(X0−Xmin) is the largest, followed by the downward-direction difference W3=(Y0−Ymin) and the upward-direction difference W4=(Ymax−Y0) whose values are approximately the same, and by the leftward-direction difference W2=(Xmax−X0) which has the smallest value.

In addition, in the present first embodiment, the load range determining unit 12 judges that scrolling is most likely to be performed in the rightward direction that has the greatest difference, judges that display data that is displayed on the display unit 2 when scrolling is performed in the rightward direction or, in other words, display data arranged in an area to the right of the present display range 200 has a high priority, and judges that there is a descending order of priorities starting from nearby the present display range 200.

In other words, in FIG. 5, display data arranged in areas 1201, 1202, and 1203 on a right side of the present display range 200 are judged to have high priorities. Generally, for example, when the user desires to scroll display contents in a rightward direction in the operating range 110 of the touch panel shown in FIG. 3A, it is conceivable that the user is likely to touch a right half of the operating range 110 of the touch panel in order to increase space to move the finger in the leftward direction. Therefore, in the present first embodiment, the load range determining unit 12 judges display data arranged in a direction having a greatest difference between the present display range 200 and the load range 120 among display data to be arranged in the load range 120 to have a high priority.

Furthermore, the load range determining unit 12 judges display data near the present display range 200 among display data arranged in areas 1201, 1202, and 1203 on a right side of the present display range 200 to have a high priority. In other words, in FIG. 5, it is judged that priorities are high in an order of respective display data in the area 1201, the area 1202, and the area 1203 among the areas 1201, 1202, and 1203. Accordingly, when display contents are scrolled in the rightward direction, priorities are judged as being high in an order in which the display data is to be displayed on the display unit 2.

Next, the load range determining unit 12 judges that display data in areas 1204a and 1204b which is display data displayed on the display unit 2 when scrolling is performed in a direction close to the rightward direction or, in other words, a direction slightly inclined with respect to the rightward direction has a high priority. Moreover, in the present first embodiment, since the values of the downward-direction difference W3=(Y0−Ymin) and the upward-direction difference W4=(Ymax−Y0) are approximately the same, display data in one of areas 1204a and 1204b may be judged to have a high priority.

Subsequently, in a similar manner, the load range determining unit 12 repeats a sequence of determining a direction having a next greatest difference and judging display data arranged in that direction to have a high priority until priorities are judged for all pieces of display data arranged in the load range 120.

In other words, in FIG. 5, since the values of the downward-direction difference W3=(Y0−Ymin) and the upward-direction difference W4=(Ymax−Y0) are approximately the same, display data in one of areas 1205a and 1205b is judged to have a high priority.

Subsequently, display data in one of areas 1206a and 1206b which is display data displayed when scrolling is performed in a direction near the downward and upward directions is judged to have a high priority. Moreover, while the display data in the areas 1205a and 1205b is judged to have a higher priority than the display data in the areas 1206a and 1206b in this case, since the values of the downward-direction difference W3=(Y0−Ymin) and the upward-direction difference W4=(Ymax−Y0) are approximately the same, for example, priorities may be judged as being in a descending order of areas 1205a, 1206a, 1205b, and 1206b. Furthermore, display data in an area 1207 corresponding to the smallest leftward difference W4=(Xmax−X0) is judged to have a lowest priority.

While priorities have been judged by setting the areas 1201, 1202, and 1203 in FIG. 5 in units of partial areas depicted by dashed lines for the sake of simplicity, in practice, priorities may be judged by setting the areas 1201, 1202, and 1203 in units of pixels or units of pixel rows.

Subsequently, the loading unit 13 sequentially acquires display data arranged in the load range 120 from the primary storage unit 15 in a descending order of priorities from the display data judged to have a high priority by the load range determining unit 12, and stores the display data in the secondary storage unit 16 (step S6). While the present process may be performed as a synchronous process, the present process is performed as asynchronous process in the present first embodiment in consideration of responsiveness to user operations and is performed in parallel with processes performed in the present and subsequent steps.

As described above, by judging that display data arranged in a direction having a greatest difference between the present display range 200 and the load range 120 has a high priority and sequentially loading display data starting from the display data judged to have a high priority, display data is loaded starting from display data arranged in a direction in which scrolling is most likely to be performed. As a result, when the display range 200 actually moves due to scrolling, a situation can be prevented in which loading of display data included in the display range 200 which is executed asynchronously is not yet finished.

Next, the detecting unit 11 judges whether or not the contact position 111 of the finger on the touch panel has been moved by the user in order to scroll the screen by a slide operation (step S7). When the user has not moved the finger (NO in step S7), a progress is made to step S10. On the other hand, when the user has moved the finger (YES in step S7), the detecting unit 11 notifies a movement position during the slide operation to the display control unit 14 (step S8).

Subsequently, the display control unit 14 moves the display range 200 on the secondary storage unit 16 in accordance with the movement position during the slide operation notified from the detecting unit 11, and displays display data included in the display range 200 on the display unit 2 as needed and scrolls display contents of the display unit 2 (step S9). Specifically, when the finger is moved from the contact position 111 shown in FIG. 3B to the contact position 111 shown in FIG. 3C, the display contents of the display unit 2 are scrolled by moving the display range 200 from a position shown in FIG. 4B to a position shown in FIG. 4C and displaying display data arranged in the display range 200 shown in FIG. 4C on the display unit 2. The load range 120 is determined in step S5 by the load range determining unit 12 based on a maximum movement distance over which the user can move without detaching the finger. Therefore, in the present step S9, even if the display range 200 is moved in accordance with the movement distance of the finger, the display range 200 does not move outside the load range 120.

Next, the detecting unit 11 judges whether or not the user has detached the finger from the touch panel in order to end the slide operation (step S10). When the user has not detached the finger (NO in step S10), the slide operation is judged as being ongoing and a return is made to step S7. On the other hand, when the user has detached the finger (YES in step S10), the slide operation is judged as being finished and an end of the slide operation is notified to the display control unit 14.

Upon notification of the end of the slide operation, the display control unit 14 judges whether or not display data in the display range 200 is entirely stored in the secondary storage unit 16 as a result of the display data loading process asynchronously executed in step S6 (step S11). When display data in the display range 200 is entirely stored in the secondary storage unit 16 (YES in step S11), the process is finished. On the other hand, when the loading process asynchronously executed in step S6 has not been concluded and a part of the display data in the display range 200 is not stored in the secondary storage unit 16 (NO in step S11), stand-by is performed until the display data in the display range 200 is entirely stored in the secondary storage unit 16 (step S12), and when the display data in the display range 200 is entirely stored in the secondary storage unit 16, display data included in the display range 200 is displayed on the display unit 2 (step S13) and the process is finished. Alternatively, when the loading process of step S6 is executed as a synchronous process, the processes of steps S11 to S13 may be omitted.

According to the present first embodiment, the load range determining unit 12 predicts a maximum scrolling amount in each scrolling direction in which the user may next perform an operation based on coordinates of a slide operation starting position received from the detecting unit 11, and determines the load range 120. Therefore, only display data having a high possibility of being displayed on the display unit 2 can be loaded to the secondary storage unit 16 before a scroll operation of the user is finalized. In addition, the load range determining unit 12 judges that display data in a direction in which scrolling is most likely to be performed among the display data in the load range 120 has a high priority, and the loading unit 13 loads display data from the primary storage unit 15 to the secondary storage unit 16 in a descending order of priorities as determined by the load range determining unit 12. As a result, display data can be loaded to the secondary storage unit 16 in a descending order of possibilities of being displayed due to scrolling before a scroll operation of the user is finalized. Therefore, according to the present first embodiment, high-speed scrolling can be realized while suppressing load processing time and memory consumption necessary for the secondary storage unit 16.

In addition, according to the present first embodiment, as described with reference to FIG. 5, after areas 1201, 1202, and 1203 in a direction (in the first embodiment, the rightward direction) in which the load range determining unit 12 predicts that scrolling is most likely to be performed as viewed from the display range 200, the load range determining unit 12 judges that a direction having a rightward-direction component as viewed from the display range 200 or, in other words, areas 1204a and 1204b in an obliquely-rightward direction have a next highest priority. Therefore, when a direction of a scroll operation by the user is a direction having a component of a direction predicted to have a highest priority, display data in that direction is preferentially loaded to the secondary storage unit 16. Therefore, scrolling of display contents can be favorably performed.

Moreover, while the present first embodiment is favorable in that the load range determining unit 12 judges a priority of display data in the load range 120 and the loading unit 13 loads display data in a descending order of priorities from the primary storage unit 15 to the secondary storage unit 16, such an arrangement is not restrictive. For example, instead of having the load range determining unit 12 judge a priority of display data in the load range 120, the loading unit 13 may load display data in the load range 120 determined by the load range determining unit 12 to the secondary storage unit 16 according to a preset order (for example, in a downward sequence from a topmost pixel row starting at a pixel in a top left corner in FIG. 4B). In addition, the loading unit 13 may acquire display data in a range of the load range 120 excluding the display range 200 from the primary storage unit 15 and load the display data to the secondary storage unit 16 or may acquire display data in the entire load range 120 including the display range 200 from the primary storage unit 15 and overwrite the secondary storage unit 16 with the display data.

Second Embodiment

Figure 6:
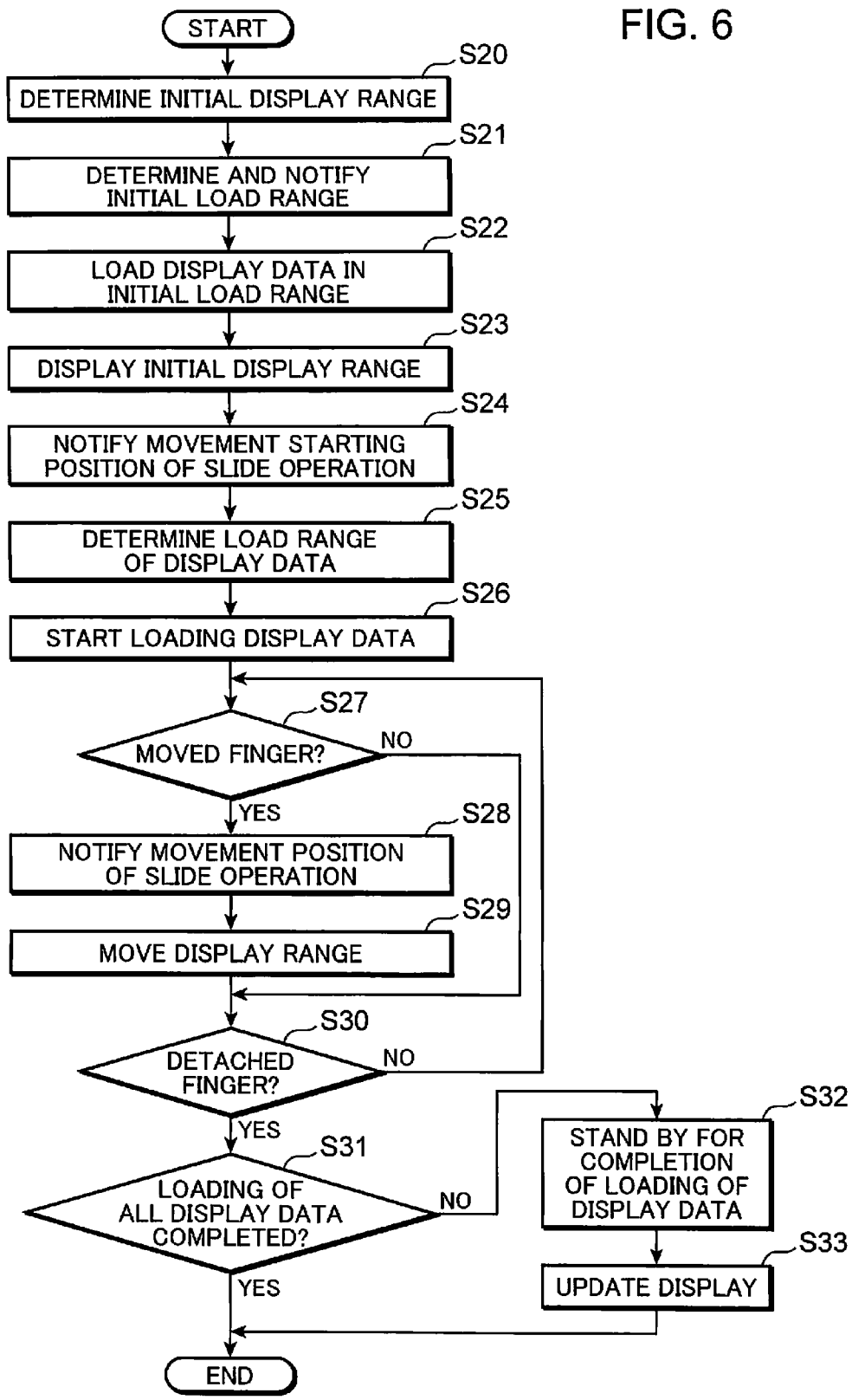
FIG. 6 is a flow chart showing a flow of processes from an initial display on a display unit to scrolling of display contents according to a second embodiment of the present invention.
Figure 7A:
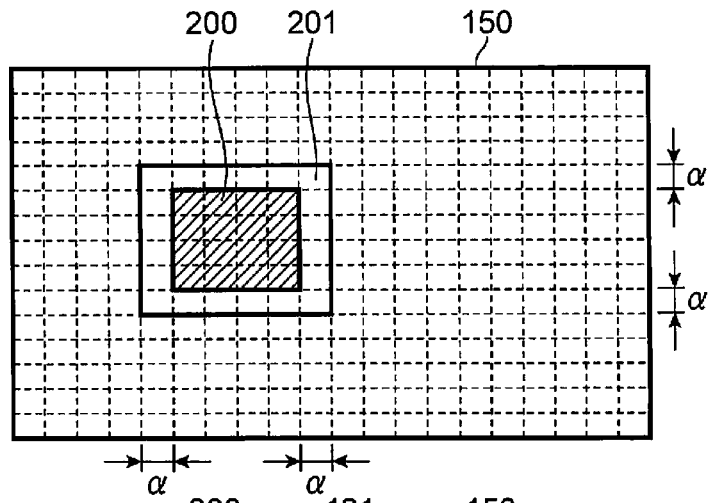
FIGS. 7A to 7C are diagrams showing a load range and a display range according to the second embodiment of the present invention.
Figure 7B:
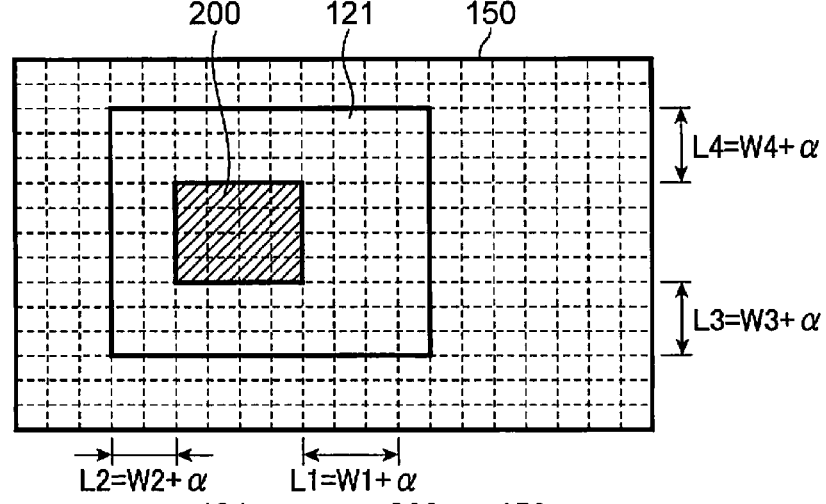
Figure 7C:
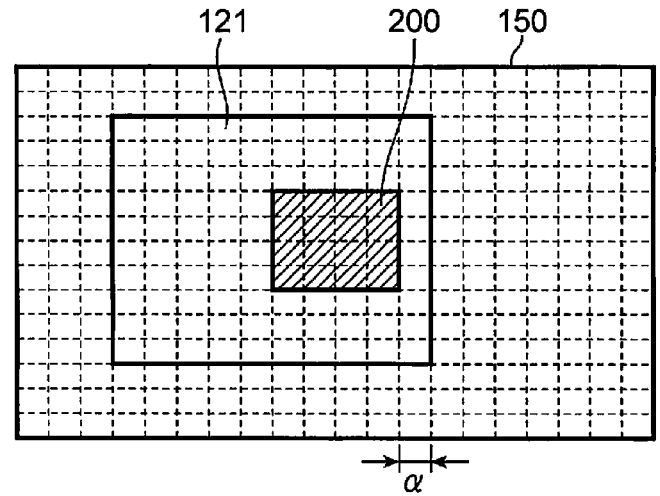

FIG. 6 is a flow chart showing a flow of processes from an initial display to performing scrolling according to a second embodiment, and FIGS. 7A to 7C are diagrams showing an example of a load range determined by the load range determining unit 12 according to the second embodiment. FIGS. 7A, 7B, and 7C are diagrams respectively showing contents of the secondary storage unit 16 and a load range determined by the load range determining unit 12 upon initial display, upon start of a slide operation, and upon end of a slide operation. Moreover, configurations of the scrolling apparatus 1 and an operating range 110 of the touch panel according to the second embodiment are similar to the configurations according to the first embodiment respectively shown in FIGS. 1 and 3A to 3C. The following description will focus on differences from the first embodiment.

In FIG. 6, first, as shown in FIG. 7A, the display control unit 14 determines a display range 200 in which initial display is performed (step S20). Next, based on the display range 200 of the initial display determined in step S20, the display control unit 14 determines an initial load range 201 during the initial display and notifies the same to the loading unit 13 (step S21). In the present second embodiment, when performing initial display, as shown in FIG. 7A, the display control unit 14 determines an area created by expanding the display range 200 in each direction by a predetermined width α as the initial load range 201.

Next, the loading unit 13 acquires display data to be arranged in the initial load range 201 from the primary storage unit 15 and stores the display data in the secondary storage unit 16 (step S22). Subsequent steps S23 and S24 are similar to steps S3 and S4 in FIG. 2.

Next, in step S25, as shown in FIG. 7B, the load range determining unit 12 determines an area expanded by respective sums of widths W1, W2, W3, and W4 by which scrolling is predicted to possibly be performed in the respective directions and a predetermined width α as a load range 121.

Specifically, as shown in FIG. 7B, the load range determining unit 12 determines a range created by expanding a right end of the display range 200 in the rightward direction by $L1=W1+\alpha=(X0-Xmin)+\alpha$, a left end of the display range 200 in the leftward direction by $L2=W2+\alpha=(Xmax-X0)+\alpha$, a lower end of the display range 200 in the downward direction by $L3=W3+\alpha=(Y0-Ymin)+\alpha$, and an upper end of the display range 200 in the upward direction by $L4=W4+\alpha=(Ymax-Y0)+\alpha$ as the load range 121.

Subsequent steps S26 to S28 are similar to steps S6 to S8 in FIG. 2. In a following step S29, in a similar manner as in the first embodiment, when the user moves the finger from the contact position 111 shown in FIG. 3B to the contact position 111 shown in FIG. 3C, the display control unit 14 moves the display range 200 from a position shown in FIG. 7B to a position shown in FIG. 7C, and the display contents of the display unit 2 are scrolled by displaying display data arranged in the display range 200 shown in FIG. 7C on the display unit 2. Subsequent steps S30 to S33 are similar to steps S10 to S13 in FIG. 2.

According to the present second embodiment, the following advantageous effects are achieved in addition to those achieved by the first embodiment. That is, since the display control unit 14 determines an area created by expanding the display range 200 in each direction by a predetermined width α as the initial load range 201 during initial display, even when the user moves the display range 200 by moving a finger immediately after bringing the finger into contact with the touch panel, display data not yet loaded can be prevented from being included in the display range 200.

In addition, according to the present second embodiment, in step S5, the load range determining unit 12 determines a range expanded by a sum of a maximum movement distance that is movable without the user detaching the finger and a predetermined width α as the load range 121. Therefore, even if the user moves the finger by a maximum movement distance from the contact position 111 shown in FIG. 3B to the contact position 111 shown in FIG. 3C, as shown in FIG. 7C, the display range 200 has not reached a right end of the load range 121 and a margin of a predetermined width α remains to a right side of the load range 121. As a result, even if the user quickly performs consecutive scroll operations in a same direction, scrolling of the display contents of the display unit 2 can be favorably performed.

In addition, according to the present second embodiment, since the initial load range 201 that is created by expanding the display range 200 in each direction by a predetermined width α is loaded to the secondary storage unit 16 during initial display, there is a margin of the predetermined width α in each direction with respect to the display range 200. Therefore, even if the user performs a scroll operation in a direction other than a direction having a greatest difference between the present display range 200 and the load range 121, display contents of the display unit 2 can be favorably scrolled.

Moreover, in the present second embodiment, for example, the predetermined width α is set as a predetermined number of pixels and may be set as a width corresponding to one unit of a display object displayed on the display unit 2. For example, if the display object is a photograph, a next row of photographs may be set as the predetermined width α. In addition, if the display object is a list of items, a next row of items may be set as the predetermined width α.

In addition, while the predetermined width α is a fixed value in the present second embodiment, when there is display data that has not yet been loaded in step S31, the value of the predetermined width α may be increased. In addition, after increasing the value of the predetermined width α, the predetermined width α may be restored to an initial value at a predetermined timing.

Furthermore, in a similar manner as in the first embodiment, in the present second embodiment, a priority of display data in the load range 121 may be judged by the load range determining unit 12 and the display data may be loaded by the loading unit 13 in a descending order of priorities from the primary storage unit 15 to the secondary storage unit 16. Moreover, instead of having the load range determining unit 12 judge a priority of display data in the load range 121, the loading unit 13 may load display data in the load range 121 determined by the load range determining unit 12 to the secondary storage unit 16 according to a preset order (for example, in a downward sequence from a topmost pixel row starting at a pixel in a top left corner in FIG. 7B). In addition, the loading unit 13 may acquire display data in a range of the load range 121 excluding the initial load range 201 from the primary storage unit 15 and load the display data to the secondary storage unit 16 or may acquire display data in the entire load range 121 including the initial load range 201 from the primary storage unit 15 and overwrite the secondary storage unit 16 with the display data.

Third Embodiment

While a case where a range created by expanding the display range 200 in all directions is set as the load range 120 has been described in the first embodiment above, when a further suppression of memory consumption is desired, a range created by expanding the present display range 200 only in a direction having a greatest predicted movement distance may be set as the load range.

Figure 8:
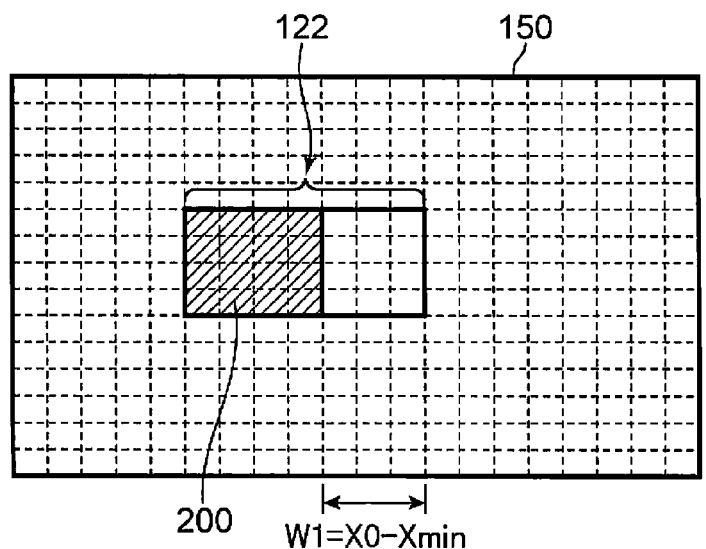
FIG. 8 is a diagram showing a load range and a display range according to a third embodiment of the present invention.

FIG. 8 is a diagram showing a load range 122 determined by the load range determining unit 12 according to a third embodiment. Moreover, configurations of the scrolling apparatus 1 and an operating range 110 of the touch panel according to the third embodiment are similar to the configurations according to the first embodiment respectively shown in FIGS. 1 and 3A to 3C. In addition, a basic flow of processes from initial display to performing scrolling is similar to that of the first embodiment shown in FIG. 4. The following description will focus on differences from the first embodiment.

As described above, generally, for example, when the user desires to scroll display contents in a rightward direction in the operating range 110 of the touch panel shown in FIG. 3A, it is conceivable that the user is likely to touch a right half of the operating range 110 of the touch panel in order to increase space to move the finger in the leftward direction. In consideration thereof, in the present third embodiment, the load range determining unit 12 determines a range expanded only in a direction corresponding to a maximum movement distance among movement distances by which scrolling is predicted to possibly be performed in respective directions as a load range.

Specifically, in the present third embodiment, when coordinates A0 of a slide starting position is detected by the detecting unit 11 as shown in FIG. 3B, the load range determining unit 12 compares four values including a distance (X0−Xmin) between the coordinates A0 and coordinates A1, a distance (Xmax−X0) between the coordinates A0 and coordinates A2, a distance (Y0−Ymin) between the coordinates A0 and coordinates A3, and a distance (Ymax−Y0) between the coordinates A0 and coordinates A4, and obtains a maximum value. In this case, as shown in FIG. 3B, the distance (X0−Xmin) between the coordinates A0 and coordinates A1 is greatest. Subsequently, as shown in FIG. 8, the load range determining unit 12 determines a range created by expanding a right end of the display range 200 by a width of W1=(X0−Xmin) in the rightward direction as a load range 122.

According to the present third embodiment, since the load range determining unit 12 determines a range expanded only in a direction corresponding to a maximum movement distance among movement distances by which scrolling is predicted to possibly be performed in respective directions as the load range 122, a memory capacity required by the secondary storage unit 16 can be reduced.

Moreover, in a similar manner as in the first embodiment, in the present third embodiment, a priority of display data in the load range 122 may be judged by the load range determining unit 12 and the display data may be loaded by the loading unit 13 in a descending order of priorities from the primary storage unit 15 to the secondary storage unit 16. In other words, the load range determining unit 12 may judge that an area adjacent to the display range 200 among the load range 122 has a high priority and the loading unit 13 may load display data in a descending order of the priorities. In addition, instead of having the load range determining unit 12 judge a priority of display data in the load range 122, the loading unit 13 may load display data in the load range 122 determined by the load range determining unit 12 to the secondary storage unit 16 according to a preset order. Furthermore, the loading unit 13 may acquire display data in a range of the load range 122 excluding the display range 200 from the primary storage unit 15 and load the display data to the secondary storage unit 16 or may acquire display data in the entire load range 122 including the display range 200 from the primary storage unit 15 and overwrite the secondary storage unit 16 with the display data.

Figure 9:
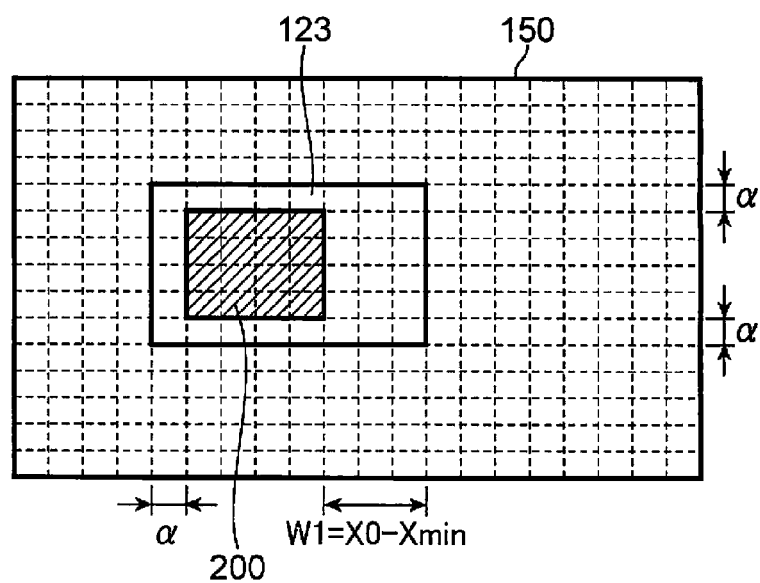
FIG. 9 is a diagram showing a load range and a display range according to a modification of the third embodiment of the present invention.

In addition, in the present third embodiment, as shown in FIG. 9, the load range determining unit 12 may determine a range expanded in each direction with the exception of a direction corresponding to a maximum movement distance by a predetermined distance α as a load range 123. According to this configuration, while reducing a memory capacity required by the secondary storage unit 16, display contents of the display unit 2 can be favorably scrolled even if the user performs a scroll operation in a direction other than the direction corresponding to the maximum movement distance in a similar manner as in the second embodiment.

Furthermore, even in the case shown in FIG. 9, a priority of display data in the load range 123 may be judged by the load range determining unit 12 and the display data may be loaded by the loading unit 13 in a descending order of priorities from the primary storage unit 15 to the secondary storage unit 16. Moreover, instead of having the load range determining unit 12 judge a priority of display data in the load range 123, the loading unit 13 may load display data in the load range 123 determined by the load range determining unit 12 to the secondary storage unit 16 according to a preset order. In addition, the loading unit 13 may acquire display data in a range of the load range 123 excluding the display range 200 from the primary storage unit 15 and load the display data to the secondary storage unit 16 or may acquire display data in the entire load range 123 including the display range 200 from the primary storage unit 15 and overwrite the secondary storage unit 16 with the display data.

Fourth Embodiment

While the respective embodiments described above are configured such that a displayable coordinate range of the display unit 2 and an inputtable coordinate range of the operating range 110 of the detecting unit 11 are consistent with each other as is the case of a touch panel, when resolutions of the display unit 2 and the operating range 110 of the detecting unit 11 are not consistent with each other as is the case of a touch pad, coordinates calculated according to a difference between resolutions by multiplying input coordinates of the operating range 110 of the detecting unit 11 with a ratio between coordinate ranges of the display unit 2 and the operating range 110 of the detecting unit 11 may be used as the coordinates of the touch pad and a load range and a scrolling amount may be determined based on the coordinates.

Figure 10:
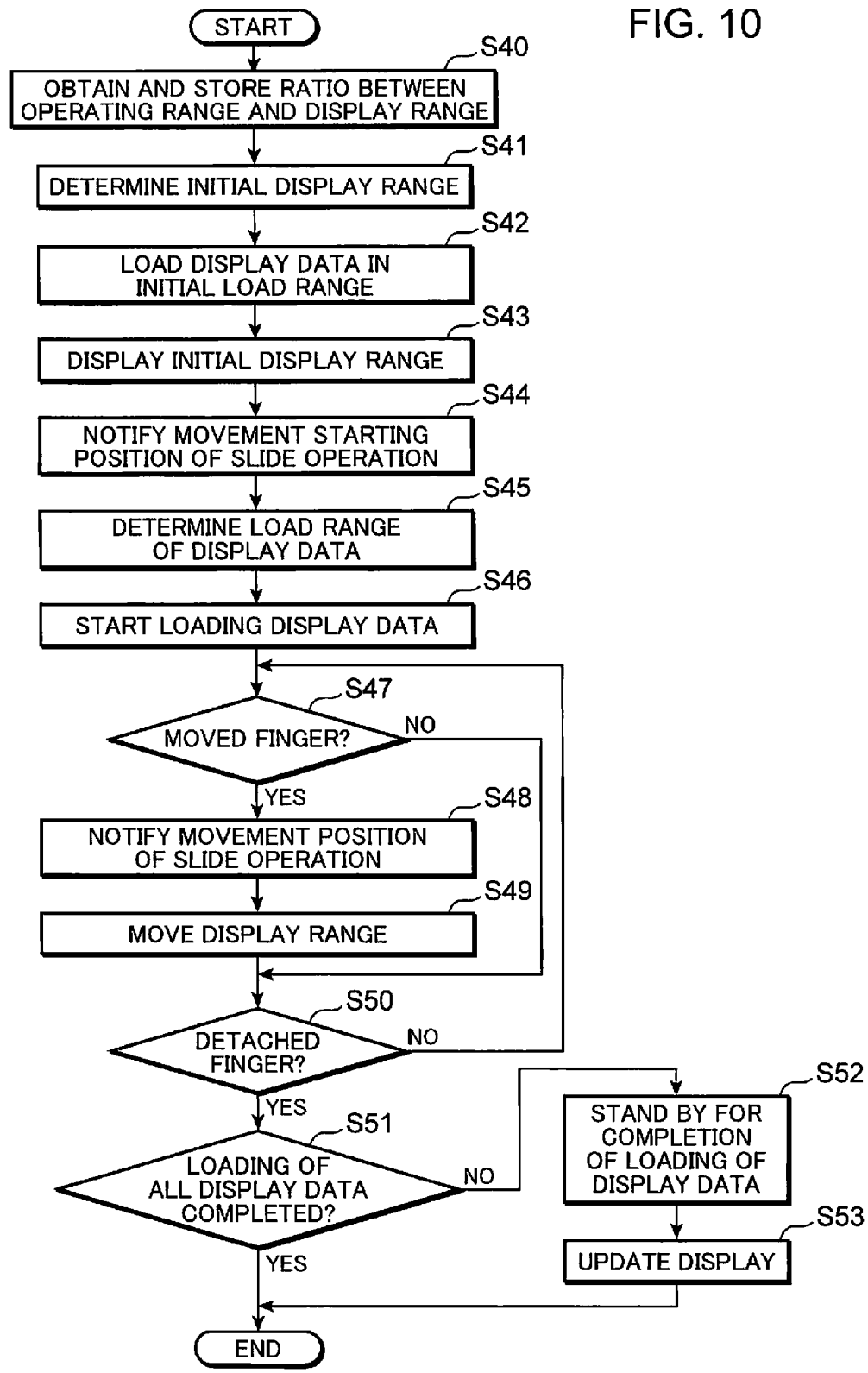
FIG. 10 is a flow chart showing a flow of processes from an initial display on a display unit to scrolling of display contents according to a fourth embodiment of the present invention.
Figure 11A:
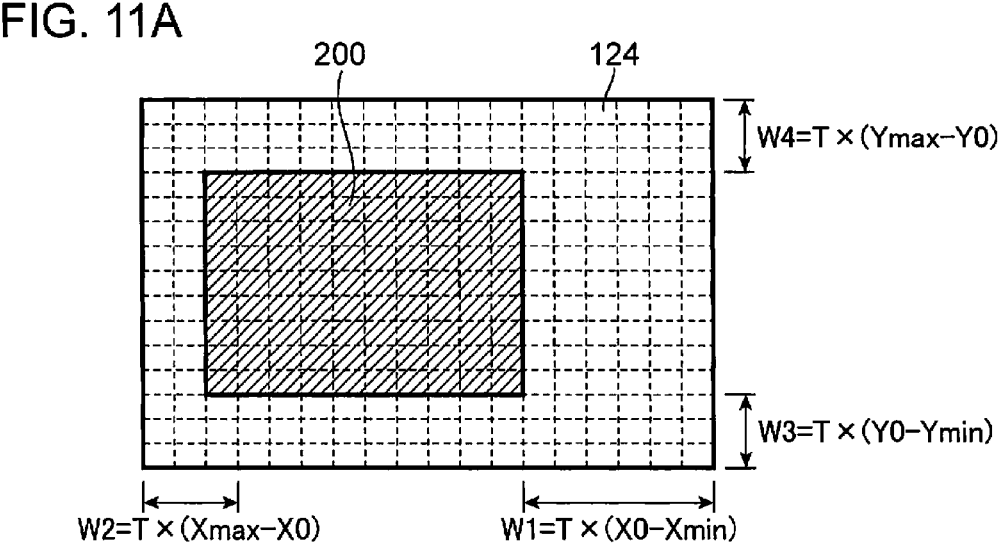
FIGS. 11A and 11B are diagrams showing a load range and a display range according to a fourth embodiment of the present invention.
Figure 11B:
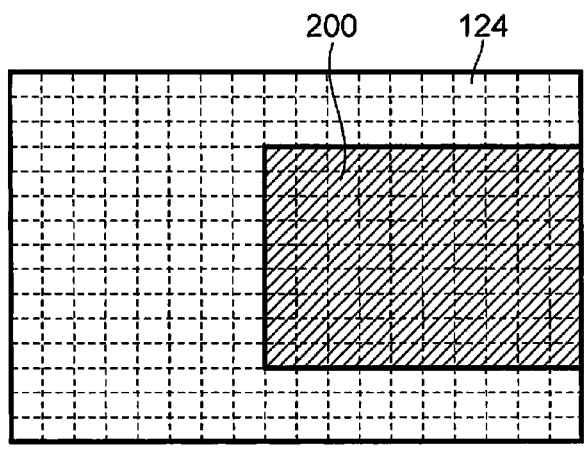
Figure 12A:
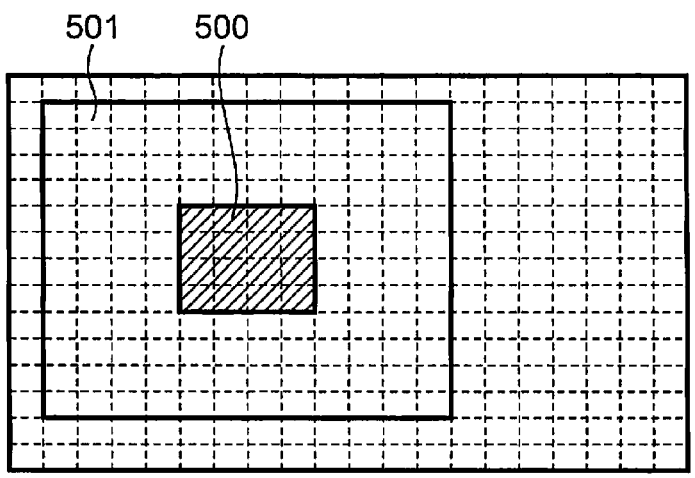
FIGS. 12A to 12C are diagrams showing a conventional load range and a conventional display range.
Figure 12B:
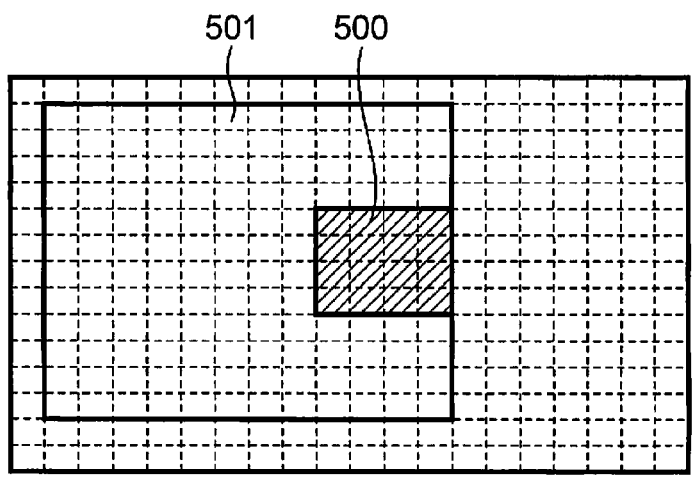
Figure 12C:
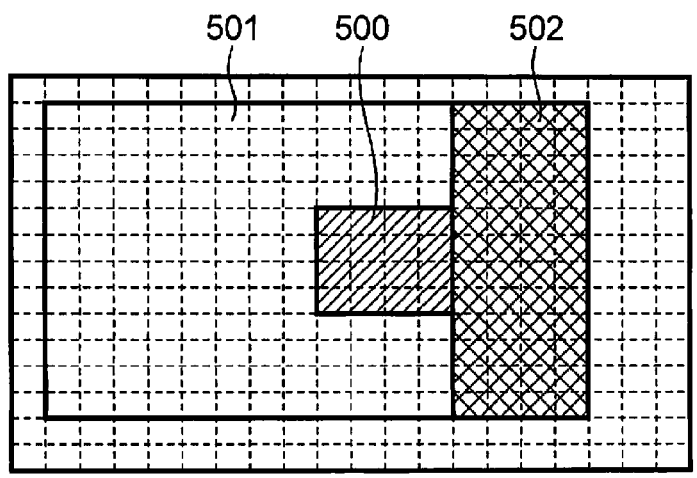

FIG. 10 is a flow chart showing a flow of processes from an initial display to performing scrolling according to a fourth embodiment that uses a touch pad, and FIGS. 11A and 11B are diagrams showing an example of a load range determined by the load range determining unit 12 according to the fourth embodiment. FIGS. 11A and 11B are diagrams respectively showing a load range determined by the load range determining unit 12 upon start of a slide operation and upon end of a slide operation. Moreover, a configuration of the scrolling apparatus 1 according to the fourth embodiment is similar to the configuration according to the first embodiment shown in FIG. 1. Furthermore, for the sake of simplicity, a configuration of an operating range 110 of the touch pad according to the fourth embodiment is similar to the configuration according to the first embodiment shown in FIGS. 3A to 3C. The following description will focus on differences from the first embodiment.

In FIG. 10, first, the display control unit 14 obtains a ratio T between coordinate ranges of the operating range 110 of the detecting unit 11 (touch pad) and a display range 200 of the display unit 2 based on the operating range 110 of the detecting unit 11 (touch pad) and the display range 200 of the display unit 2, and stores the ratio T in a memory (step S40). The ratio T can be obtained by acquiring coordinate range information from the display unit 2 when the display control unit 14 is connected to the display unit 2 by a wired or a wireless connection and then using the acquired coordinate range and a coordinate range of the operating range 110 that is known in advance.

Subsequent steps S41 to S44 are similar to steps S1 to S4 in FIG. 2. In a next step S45, the load range determining unit 12 determines a load range of display data based on a notified slide starting position and on the ratio T determined and stored in the memory by the display control unit 14 in step S40. Specifically, as shown in FIG. 11A, the load range determining unit 12 determines a range created by expanding a right end of the display range 200 in the rightward direction by W1=T×(X0−Xmin), a left end of the display range 200 in the leftward direction by W2=T×(Xmax−X0), a lower end of the display range 200 in the downward direction by W3=T×(Y0−Ymin), and an upper end of the display range 200 in the upward direction by W4=T×(Ymax−Y0) as the load range 124.

Subsequent steps S46 to S48 are similar to steps S6 to S8 in FIG. 2. In a next step S49, the display control unit 14 moves the display range 200 on the secondary storage unit 16 in accordance with the movement position during the slide operation notified from the detecting unit 11 and the ratio T stored in the memory, and displays display data included in the display range 200 on the display unit 2 as needed to scroll display contents of the display unit 2. Specifically, when the finger is moved from the contact position 111 shown in FIG. 3B to the contact position 111 shown in FIG. 3C, the display contents of the display unit 2 are scrolled by moving the display range 200 from a position shown in FIG. 11A to a position shown in FIG. 11B and displaying display data arranged in the display range 200 shown in FIG. 11B on the display unit 2. Moreover, the load range 124 is determined in step S45 by the load range determining unit 12 based on a maximum movement distance over which the user can move without detaching the finger. Therefore, in the present step S49, even if the display range 200 is moved in accordance with the movement distance of the finger, the display range 200 does not move outside the load range 124 in a similar manner to the first embodiment described above. Subsequent steps S50 to S53 are similar to steps S10 to S13 in FIG. 2.

According to the present fourth embodiment, even though a touch pad is used in which a displayable coordinate range of the display unit 2 and an inputtable coordinate range of the detecting unit 11 are not consistent with each other, similar advantageous effects to those of the first embodiment described above that uses a touch panel in which a displayable coordinate range of the display unit 2 and an inputtable coordinate range of the detecting unit 11 are consistent with each other can be achieved.

Moreover, in a similar manner as in the first embodiment, in the present fourth embodiment, a priority of display data in the load range 124 may be judged by the load range determining unit 12 and the display data may be loaded by the loading unit 13 in a descending order of priorities from the primary storage unit 15 to the secondary storage unit 16. In addition, instead of having the load range determining unit 12 judge a priority of display data in the load range 124, the loading unit 13 may load display data in the load range 124 determined by the load range determining unit 12 to the secondary storage unit 16 according to a preset order. Furthermore, the loading unit 13 may acquire display data in a range of the load range 124 excluding the display range 200 from the primary storage unit 15 and load the display data to the secondary storage unit 16 or may acquire display data in the entire load range 124 including the display range 200 from the primary storage unit 15 and overwrite the secondary storage unit 16 with the display data.

Other Embodiments

Moreover, while cases where scrolling is performed in the upward, downward, leftward, and downward directions by a slide operation on a touch pad or a touch panel have been described in the respective embodiments above, the present invention may also be applied to a case where display data in a display area is reduced by a pinching-in operation. Operations in this case will now be described with reference to FIG. 2 and by focusing on differences from the first embodiment. In step S4 in FIG. 2, when a user brings two fingers into contact with a pointing device such as a touch panel to start a pinching-in operation, the detecting unit 11 notifies positions in contact with the two fingers as a movement starting position to the load range determining unit 12.

Next, in step S5 in FIG. 2, based on the notified starting position, the load range determining unit 12 determines a load range of the display data. Specifically, the load range determining unit 12 calculates a distance D between positions in contact with the two fingers. The load range determining unit 12 compares the calculated distance D with a predetermined distance D1, and judges that reduced display is performed when the calculated distance D is greater than the predetermined distance D1. In this case, for example, the predetermined distance D1 is assumed as a value corresponding to a spacing between two fingers that are spread apart under normal circumstances by a user when performing a pinching-in operation. At this point, if Dmin denotes a minimum value inputtable as a distance between the two fingers, the load range determining unit 12 predicts that a screen may possibly be reduced down to a quantity corresponding to a difference (D−Dmin). In this case, for example, 0 is used as the value Dmin. Alternatively, a given fixed value may be used as the value Dmin in consideration of a width of the user's fingers and the like. In this case, a range of display data that is newly displayed on the display unit 2 when the display data presently displayed on the display unit 2 is reduced by a quantity in accordance with the difference (D−Dmin) is assumed as a reducible range. As a result of the prediction described above, the load range determining unit 12 determines that the reducible range is a load range of the display data. By performing subsequent processes in a same manner as the contents described in the first embodiment above, a case where reduced display is performed by a pinching-in operation can also be achieved at high speed.

Furthermore, in addition to the pinching-in operation described above, the present invention may alternatively be applied to an enlarged display process by a pinching-out operation. Operations in this case will now be described with reference to FIG. 2 and by focusing on differences from the first embodiment. In step S4 in FIG. 2, when a user brings two fingers into contact with a pointing device such as a touch panel to start a pinching-out operation, the detecting unit 11 notifies positions in contact with the two fingers as a movement starting position to the load range determining unit 12.

Next, in step S5 in FIG. 2, based on the notified starting position, the load range determining unit 12 determines a load range of the display data. Specifically, the load range determining unit 12 calculates a distance D between positions in contact with the two fingers. The load range determining unit 12 compares the calculated distance D with a predetermined distance D2, and judges that enlarged display is performed when the calculated distance D is smaller than the predetermined distance D2.

In this case, for example, the predetermined distance D2 is assumed as a value corresponding to a spacing between two fingers that are spread apart under normal circumstances by a user when performing a pinching-out operation. In addition to the example described above, the predetermined distance D2 may be a same value as the predetermined distance D1 described earlier. At this point, if Dmax denotes a maximum value inputtable as a distance between the two fingers, the load range determining unit 12 predicts that a screen may possibly be enlarged up to a quantity corresponding to a difference (Dmax−D). In this case, for example, whichever is smaller of a maximum length by which a person spreads his (her) fingers and a maximum value of a distance between two points that are inputtable on the touch panel is used as the value Dmax.

In the case of enlarged display, while an amount of display data that is displayed on the display unit 2 does not increase, a display size of each piece of display data may possibly increase by a quantity in accordance the difference (Dmax−D). Therefore, instead of loading new display data, the load range determining unit 12 determines display data with a higher resolution as a load range in place of presently-displayed display data in order to enable high-quality display when enlarged display is performed. Accordingly, even an enlarged display by a pinching-out operation can be performed at high speed.

Moreover, while cases where scrolling is performed by a slide operation on a touch pad or a touch panel have been described in the respective embodiments above, a scroll operation may alternatively be performed using other pointing devices such as by a drag operation of a mouse or the like.

Furthermore, in the first to fourth embodiments described above, favorably, the operating range 110 of the touch panel or the touch pad and the display range 200 of the display unit 2 respectively have rectangular shapes in which one of the vertical and horizontal sides is longer than the other side by a multiple equal to or greater than 1 and smaller than 2 and which have approximately a same vertical to horizontal ratio.

For example, if the shape of the operating range 110 is a rectangle having a vertical to horizontal ratio of 3 to 1, when a user brings a finger into contact with a center in an upward and downward direction of a right end of the operating range 110 in order to scroll display contents in a rightward direction, a distance between a slide starting position and an upper end or a lower end of the operating range 110 becomes greater than a distance between the slide starting position and a left end of the operating range 110.

On the other hand, if the shape of the operating range 110 is a rectangle having a vertical to horizontal ratio of 3 to 2, when the user brings a finger into contact with a center in an upward and downward direction of a right end of the operating range 110 in order to scroll display contents in a rightward direction, a distance between a slide starting position and a left end of the operating range 110 becomes greater than a distance between the slide starting position and an upper end or a lower end of the operating range 110.

As just described, it is favorable to arrange the operating range 110 and the display range 200 of the display unit 2 to respectively have rectangular shapes in which one of the vertical and horizontal sides is longer than the other side by a multiple equal to or greater than 1 and smaller than 2 since a user can specify a contact position to the operating range 110 so that a distance between a slide starting position and an end of the operating range 110 in a desired scrolling direction becomes greater than the distance in another direction.

In addition, when the operating range 110 and the display range 200 of the display unit 2 are arranged to have rectangular shapes with approximately a same vertical to horizontal ratio, in the fourth embodiment described above, the display control unit 14 can readily obtain a ratio T between coordinate ranges of the operating range 110 and the display range 200 of the display unit 2. Furthermore, there is an advantage that a correspondence relationship between the operating range 110 and the display range 200 can be easily understood and a user can readily perform operations while viewing the display unit 2. However, in the first to third embodiments which use a touch panel, the operating range 110 and the display range 200 of the display unit 2 are consistent with each other and therefore have shapes whose vertical to horizontal ratios are equal to each other.

In addition, specific applications that use a touch panel as is the case of the first to third embodiments described above include a car navigation system and a mobile phone including a touch panel. Furthermore, specific applications that use a touch pad as is the case of the fourth embodiment described above include a mode of scrolling display contents of a television set (display unit 2) using a touch pad provided on a front surface of a remote controller of the television set or a recorder.

Moreover, while a range created by expanding the display range 200 in four directions is set as a load range in FIGS. 4A to 4C and 7A to 7C described earlier and a range created by expanding the display range 200 only in one direction is set as a load range in FIG. 8, a range created by expanding the display range 200 in two or three directions may be set as the load range.

In addition, in the respective embodiments described above, respective function blocks of the load range determining unit 12, the loading unit 13, and the display control unit 14 are typically realized as an LSI that is an integrated circuit. The function blocks may be individually configured as single chips or a single chip may be configured which includes a part of or all of the function blocks.

While the term LSI has been used, other names such as an IC, a system LSI, a super LSI, or an ultra LSI may be used depending on degrees of integration.

Furthermore, methods of realizing an integrated circuit are not limited to an LSI. An integrated circuit may be realized using a dedicated circuit or a general-purpose processor. An FPGA (Field Programmable Gate Array) that can be programmed after LSI production or a reconfigurable processor that allows reconfiguration of connections and settings of circuit cells inside an LSI after LSI production may be used.

Moreover, if techniques for realizing integrated circuits which replace LSIs should emerge due to progress made in semiconductor technology or due to derivative technology, it is obvious that the function blocks may be integrated using such techniques. The application of biotechnology or the like may potentially create such techniques.

For example, an integrated circuit that realizes the respective function blocks of the load range determining unit 12, the loading unit 13, and the display control unit 14 is used connected to an information processing device that includes the detecting unit 11, the primary storage unit 15, the secondary storage unit 16, and the display unit 2.

The specific embodiments described above primarily include an invention configured as follows. That is, a scrolling apparatus according to an aspect of the present invention is a scrolling apparatus that enables scrolling of display contents of a display unit, the scrolling apparatus comprising: a detecting unit that detects a movement starting position specified by a user in an operating range having a position that is specifiable by the user; a primary storage unit that stores display data; a secondary storage unit that stores the display data in a load range that is larger than a display range of the display unit among the display data stored in the primary storage unit; a load range determining unit that determines the load range of the display data to be loaded from the primary storage unit to the secondary storage unit according to the movement starting position detected by the detecting unit; a loading unit that loads the display data in the load range determined by the load range determining unit from the primary storage unit to the secondary storage unit; and a display control unit that displays on the display unit display data in the display range among the display data in the load range stored in the secondary storage unit.

According to the configuration described above, the primary storage unit stores display data, and the secondary storage unit stores the display data in a load range that is larger than a display range of the display unit among the display data stored in the primary storage unit. In addition, the load range of the display data to be loaded from the primary storage unit to the secondary storage unit is determined according to the detected movement starting position, display data in the determined load range is loaded from the primary storage unit to the secondary storage unit, and display data in the display range among the display data in the load range stored in the secondary storage unit is displayed on the display unit.

As described above, since the load range is determined according to the movement starting position or, in other words, before a movement end position is specified by the user and contents of a scroll operation are finalized, scrolling of display contents of the display unit can be processed at high speed. In addition, since the load range is determined according to the movement starting position, an amount of display data that is loaded can be reduced compared to conventional cases where display data in all areas that may possibly be displayed by a scroll operation of a user is loaded before a movement starting position is specified. As a result, a load processing time of display data and memory consumption by the secondary storage unit that stores loaded display data can be reduced.

Furthermore, in the scrolling apparatus described above, favorably, the load range determining unit calculates a first distance between a first movement end position which is specifiable by the user in the operating range and which is farthest from the movement starting position in a first direction and the movement starting position detected by the detecting unit, calculates a second distance between a second movement end position which is specifiable by the user in the operating range and which is farthest from the movement starting position in a second direction that differs from the first direction and the movement starting position detected by the detecting unit, and when a direction corresponding to a longer distance of the first distance and the second distance is defined as a predicted scrolling direction, the load range determining unit judges that display data to be displayed on the display unit when the display contents are scrolled in the predicted scrolling direction among the display data in the load range has a high priority, and the loading unit sequentially loads to the secondary storage unit display data starting from data judged to have a high priority by the load range determining unit.

According to the configuration described above, a first distance between a first movement end position which is a movement end position specifiable by the user in the operating range and which is farthest from the movement starting position in a first direction and the detected movement starting position is calculated, and a second distance between a second movement end position which is a movement end position specifiable by the user in the operating range and which is farthest from the movement starting position in a second direction that differs from the first direction and the detected movement starting position is calculated. Here, a direction corresponding to whichever is a longer distance of the first distance and the second distance is defined as a predicted scrolling direction. In addition, display data to be displayed on the display unit when the display contents are scrolled in the predicted scrolling direction among the display data in the load range is judged to have a high priority, and display data is sequentially loaded to the secondary storage unit starting from the display data judged to have a high priority. In other words, for example, when the first distance is longer than the second distance, display data is preferentially loaded from the primary storage unit to the secondary storage unit starting with display data to be displayed on the display unit when the display contents are scrolled in the first direction.

At this point, for example, when the user desires to scroll the display contents in the first direction, it is conceivably likely that the user specifies a movement starting position in the operating range so that the first distance becomes greater than the second distance. Therefore, by preferentially loading display data from the primary storage unit to the secondary storage unit starting with display data to be displayed on the display unit when the display contents are scrolled in the predicted scrolling direction, display data having a high possibility of being displayed on the display unit when the display contents are scrolled can be preferentially stored in the secondary storage unit. As a result, display contents of the display unit can be favorably scrolled.

Moreover, in the scrolling apparatus described above, favorably, the load range determining unit judges that display data adjacent, in the predicted scrolling direction on the display unit, to display data in the present display range when displayed on the display unit has a high priority among display data to be displayed on the display unit when the display contents are scrolled in the predicted scrolling direction.

According to the configuration described above, display data adjacent in the predicted scrolling direction on the display unit to display data in the present display range when displayed on the display unit is judged to have a high priority among display data to be displayed on the display unit when the display contents are scrolled in the predicted scrolling direction, and display data is loaded to the secondary storage unit starting with the high-priority display data. Therefore, even when a user specifies a movement end position in the predicted scrolling direction immediately after specifying a movement starting position, since display data is preferentially loaded to the secondary storage unit starting with display data adjacent in the predicted scrolling direction on the display unit to display data in the present display range, display contents of the display unit can be favorably scrolled.

In addition, in the scrolling apparatus described above, favorably, the load range determining unit determines as the load range a range created by expanding the display range in the first direction by a width proportional to the first distance and expanding the display range in the second direction by a width proportional to the second distance.

According to the configuration described above, a range created by expanding the display range in the first direction by a width proportional to the first distance and expanding the display range in the second direction by a width proportional to the second distance is determined as the load range. Therefore, display data in a range respectively expanded in the first direction and the second direction by widths proportional to the first distance and the second distance is loaded from the primary storage unit to the secondary storage unit.

Therefore, even if the user specifies any of a first movement end position which is farthest from the movement starting position in the first direction and a second movement end position which is farthest from the movement starting position in the second direction, since display data in a range respectively expanded by widths proportional to the first distance between the movement starting position and the first movement end position and the second distance between the movement starting position and the second movement end position is stored in the secondary storage unit, display contents of the display unit can be favorably scrolled. In addition, since the load range can be prevented from becoming excessive, a load processing time of display data and memory consumption for storing loaded display data can be reduced.

Furthermore, in the scrolling apparatus described above, favorably, the load range determining unit determines as the load range a range created by expanding the display range in the first direction by a width that is a sum of a predetermined width and a width proportional to the first distance and expanding the display range in the second direction by a width that is a sum of the predetermined width and a width proportional to the second distance.

According to the configuration described above, since a range created by expanding the display range in the first direction by a width that is a sum of a predetermined width and a width proportional to the first distance and expanding the display range in the second direction by a width that is a sum of the predetermined width and a width proportional to the second distance is determined as the load range, display data in the expanded range is loaded from the primary storage unit to the secondary storage unit. Therefore, even when display contents of the display unit are consecutively scrolled at high speed in a same direction, since display data in an expanded load range is loaded to the secondary storage unit, display contents of the display unit can be favorably scrolled.

Moreover, in the scrolling apparatus described above, favorably, when a longer distance of the first distance and the second distance is defined as a predicted scrolling distance, the load range determining unit determines as the load range a range created by expanding the display range only in the predicted scrolling direction by a width proportional to the predicted scrolling distance.

According to the configuration described above, when a longer distance of the first distance and the second distance is defined as a predicted scrolling distance, since a range created by expanding the display range only in the predicted scrolling direction by a width proportional to a predicted scrolling distance is determined as the load range, display data in the expanded load range is loaded from the primary storage unit to the secondary storage unit.

At this point, for example, when the user desires to scroll the display contents in the first direction, it is conceivably likely that the user specifies a movement starting position in the operating range so that the first distance becomes greater than the second distance. Therefore, by determining a range expanded only in the predicted scrolling direction by a width proportional to the predicted scrolling distance as the load range, only display data with a high possibility of being displayed on the display unit when display contents of the display unit are scrolled can be stored in the secondary storage unit. As a result, since a load range of display data can be reduced, a load processing time of display data and memory consumption for storing loaded display data can be reduced.

In addition, in the scrolling apparatus described above, favorably, the operating range and the display range respectively have rectangular shapes in which one of vertical and horizontal sides is longer than the other side by a multiple equal to or greater than 1 and smaller than 2 and which have approximately a same vertical to horizontal ratio.

According to the configuration described above, the operating range in which a position is specifiable by the user and the display range of the display unit respectively have rectangular shapes in which one of the vertical and horizontal sides is longer than the other side by a multiple equal to or greater than 1 and smaller than 2. Therefore, in the operating range, for example, the user can specify the movement starting position so that the first distance becomes greater than the second distance when desiring to scroll display contents in the first direction and specify the movement starting position so that the second distance becomes greater than the first distance when desiring to scroll display contents in the second direction. In addition, since the respective vertical to horizontal ratios of the operating range and the display range are approximately equal to each other, when determining the load range by expanding the display range, a ratio between widths proportional to the first and second distances can be readily obtained. Furthermore, since the respective vertical to horizontal ratios of the operating range and the display range are approximately equal to each other, there is an advantage that a correspondence relationship between the operating range and the display range can be easily understood and the user can readily perform operations while viewing the display unit.

Furthermore, in the scrolling apparatus described above, favorably, the detecting unit detects positions of two points specified by the user as the movement starting position in the operating range having a position that is specifiable by the user, the load range determining unit calculates a distance between the positions of the two points detected by the detecting unit and judges whether or not a reduced display process is to be performed based on the calculated distance, a range of the display data displayed on the display unit when the reduced display process is performed by an amount in accordance with a value obtained by subtracting a preset distance from the calculated distance between the positions of the two points is defined as a reducible range, and the load range determining unit determines the reducible range as the load range when judgment is made that the reduced display process is to be performed.

According to the configuration described above, the detecting unit detects positions of two points specified by the user as the movement starting position in the operating range having a position that is specifiable by the user. The load range determining unit calculates a distance between the positions of the two points detected by the detecting unit and judges whether or not a reduced display process is to be performed based on the calculated distance. A range of the display data displayed on the display unit when the reduced display process is performed by an amount in accordance with a value obtained by subtracting a preset distance from the calculated distance between the positions of the two points is defined as a reducible range. The load range determining unit determines the reducible range as the load range when it is judged that the reduced display process is to be performed Therefore, since the loading unit loads display data in the reducible range from the primary storage unit to the secondary storage unit, the reduced display process can be performed at high speed.

Moreover, in the scrolling apparatus described above, favorably, the detecting unit detects positions of two points specified by the user as the movement starting position in the operating range having a position that is specifiable by the user, the load range determining unit calculates a distance between the positions of the two points detected by the detecting unit and judges whether or not an enlarged display process is to be performed based on the calculated distance, a range of the display data displayed on the display unit when the enlarged display process is performed by an amount in accordance with a value obtained by subtracting the calculated distance between the positions of the two points from a preset distance is defined as an enlargeable range, and the load range determining unit determines the enlargeable range as the load range when judgment is made that the enlarged display process is to be performed.

According to the configuration described above, the detecting unit detects positions of two points specified by the user as the movement starting position in the operating range having a position that is specifiable by the user. The load range determining unit calculates a distance between the positions of the two points detected by the detecting unit and judges whether or not an enlarged display process is to be performed based on the calculated distance. A range of the display data displayed on the display unit when the enlarged display process is performed by an amount in accordance with a value obtained by subtracting the calculated distance between the positions of the two points from a preset distance is defined as an enlargeable range. The load range determining unit determines the enlargeable range as the load range when it is judged that the enlarged display process is to be performed. Therefore, since the loading unit loads display data in the enlargeable range from the primary storage unit to the secondary storage unit, the enlarged display process can be performed at high speed.

A scrolling method according to another aspect of the present invention is a scrolling method of scrolling display contents of a display unit, the scrolling method comprising: a detecting step of detecting a movement starting position specified by a user in an operating range having a position that is specifiable by the user; a load range determining step of determining, according to the movement starting position detected in the detecting step, a load range, which is larger than a display range of the display unit, of display data to be loaded from a primary storage unit that stores display data to a secondary storage unit that stores the display data, among the display data stored in the primary storage unit; a loading step of loading the display data in the load range determined in the load range determining step from the primary storage unit to the secondary storage unit; and a displaying step of displaying on the display unit display data in the display range among the display data in the load range stored in the secondary storage unit.

According to the configuration described above, the load range of the display data to be loaded from the primary storage unit to the secondary storage unit is determined according to the detected movement starting position, display data in the determined load range is loaded from the primary storage unit to the secondary storage unit, and display data in the display range among the display data in the load range stored in the secondary storage unit is displayed on the display unit.

As described above, since the load range is determined according to the movement starting position or, in other words, before a movement end position is specified by the user and contents of a scroll operation are finalized, scrolling of display contents of the display unit can be processed at high speed. In addition, since the load range is determined according to the movement starting position, an amount of display data that is loaded can be reduced compared to conventional cases where display data in all areas that may possibly be displayed by a scroll operation of a user is loaded before a movement starting position is specified. As a result, a load processing time of display data and memory consumption by the secondary storage unit that stores loaded display data can be reduced.

A scrolling program according to another aspect of the present invention is a scrolling program that enables scrolling of display contents of a display unit, the scrolling program causing a computer to function as: a primary storage unit that stores display data; a secondary storage unit that stores the display data in a load range that is larger than a display range of the display unit among the display data stored in the primary storage unit; a load range determining unit that determines the load range of the display data to be loaded from the primary storage unit to the secondary storage unit according to a movement starting position specified by a user in an operating range having a position that is specifiable by the user; a loading unit that loads the display data in the load range determined by the load range determining unit from the primary storage unit to the secondary storage unit; and a display control unit that displays on the display unit display data in the display range among the display data in the load range stored in the secondary storage unit.

According to the configuration described above, the load range of the display data to be loaded from the primary storage unit to the secondary storage unit is determined according to the movement starting position specified by the user, display data in the determined load range is loaded from the primary storage unit to the secondary storage unit, and display data in the display range among the display data in the load range stored in the secondary storage unit is displayed on the display unit.

As described above, since the load range is determined according to the movement starting position or, in other words, before a movement end position is specified by the user and contents of a scroll operation are finalized, scrolling of display contents of the display unit can be processed at high speed. In addition, since the load range is determined according to the movement starting position, an amount of display data that is loaded can be reduced compared to conventional cases where display data in all areas that may possibly be displayed by a scroll operation of a user is loaded before a movement starting position is specified. As a result, a load processing time of display data and memory consumption by the secondary storage unit that stores loaded display data can be reduced.

An integrated circuit according to another aspect of the present invention is an integrated circuit that enables scrolling of display contents of a display unit, the integrated circuit comprising: a load range determining circuit that determines, according to a movement starting position specified by a user in an operating range having a position that is specifiable by the user, a load range, which is larger than a display range of the display unit, of display data to be loaded from a primary storage unit that stores display data to a secondary storage unit that stores the display data, among the display data stored in the primary storage unit; a loading circuit that loads the display data in the load range determined by the load range determining circuit from the primary storage unit to the secondary storage unit; and a display control circuit that displays on the display unit display data in the display range among the display data in the load range stored in the secondary storage unit.

According to the configuration described above, the load range of the display data to be loaded from the primary storage unit to the secondary storage unit is determined according to the movement starting position specified by the user, display data in the determined load range is loaded from the primary storage unit to the secondary storage unit, and display data in the display range among the display data in the load range stored in the secondary storage unit is displayed on the display unit.

As described above, since the load range is determined according to the movement starting position or, in other words, before a movement end position is specified by the user and contents of a scroll operation are finalized, scrolling of display contents of the display unit can be processed at high speed. In addition, since the load range is determined according to the movement starting position, an amount of display data that is loaded can be reduced compared to conventional cases where display data in all areas that may possibly be displayed by a scroll operation of a user is loaded before a movement starting position is specified. As a result, a load processing time of display data and memory consumption by the secondary storage unit that stores loaded display data can be reduced.

According to the present invention, when scrolling display contents of the display unit, a load range of display data to be loaded from the primary storage unit to the secondary storage unit is determined according to a detected movement starting position or, in other words, before a movement end position is specified by the user and contents of a scroll operation are finalized. Therefore, high-speed scrolling can be achieved. In addition, since the load range is determined according to the movement starting position, an amount of display data that is loaded can be reduced compared to conventional cases where display data in all areas that may possibly be displayed by a scroll operation of a user is loaded before a movement starting position is specified. As a result, a load processing time of display data and memory consumption by the secondary storage unit that stores loaded display data can be reduced.

The scrolling apparatus, the scrolling method, the scrolling program, and the integrated circuit according to the present invention are useful as display control devices, such as a remote controller of a television set or a recorder, a car navigation system, and a mobile phone, which enable scrolling of display contents of a display unit using a pointing device such as a touch panel or a touch pad.

The invention claimed is:

1. A scrolling apparatus that enables scrolling of display contents of a display, the scrolling apparatus comprising:
   a detector that detects a position of a movement starting point specified by a user in an operating range having a position that is specifiable by the user;
   a primary storage that stores display data;
   a secondary storage that stores the display data in a load range that is larger than a display range of the display among the display data stored in the primary storage;
   a load range determining unit that is electrically connected to the detector, the primary storage and the secondary storage, and determines the load range of the display data to be loaded from the primary storage to the secondary storage according to the position of the movement starting point detected by the detector;
   a loading unit that is electrically connected to the load range determining unit, the primary storage and the secondary storage, and loads the display data in the load range determined by the load range determining unit from the primary storage to the secondary storage; and
   a display control unit that is electrically connected to the display and the secondary storage, and displays on the display display data in the display range among the display data in the load range stored in the secondary storage,
   wherein the load range determining unit is configured to:
      calculate a first distance between a position of a first edge point and the position of the movement starting point detected by the detector, the first edge point being an edge point of the operating range farthest from the movement starting point in a first direction;
      calculate a second distance between a position of a second edge point and the position of the movement starting point detected by the detector, the second edge point being an edge point of the operating range farthest from the movement starting point in a second direction that differs from the first direction;
      define a direction corresponding to a longer distance of the first distance and the second distance as a predicted scrolling direction; and
      judge that display data to be displayed on the display when the display contents are scrolled in the predicted scrolling direction among the display data in the load range has a high priority, and
   wherein the loading unit sequentially loads to the secondary storage display data starting from data judged to have a high priority by the load range determining unit.

2. The scrolling apparatus according to claim 1, wherein the load range determining unit judges that display data adjacent, in the predicted scrolling direction on the display, to display data in the present display range when displayed on the display has a high priority among display data to be displayed on the display when the display contents are scrolled in the predicted scrolling direction.

3. The scrolling apparatus according to claim 1, wherein the load range determining unit determines as the load range a range created by expanding the display range in the first direction by a width proportional to the first distance and expanding the display range in the second direction by a width proportional to the second distance.

4. The scrolling apparatus according to claim 1, wherein the load range determining unit determines as the load range a range created by expanding the display range in the first direction by a width that is a sum of a predetermined width and a width proportional to the first distance and expanding the display range in the second direction by a width that is a sum of the predetermined width and a width proportional to the second distance.

5. The scrolling apparatus according to claim 1, wherein when a longer distance of the first distance and the second distance is defined as a predicted scrolling distance, the load range determining unit determines as the load range a range created by expanding the display range only in the predicted scrolling direction by a width proportional to the predicted scrolling distance.

6. The scrolling apparatus according to claim 1, wherein the operating range and the display range respectively have rectangular shapes in which one of vertical and horizontal sides is longer than the other side by a multiple equal to or greater than 1 and smaller than 2 and which have approximately a same vertical to horizontal ratio.

7. The scrolling apparatus according to claim 1, wherein
the detector detects positions of two points specified by the user as the movement starting point in the operating range having a position that is specifiable by the user,
the load range determining unit calculates a distance between the positions of the two points detected by the detector and judges whether or not a reduced display process is to be performed based on the calculated distance,
a range of the display data displayed on the display when the reduced display process is performed by an amount in accordance with a value obtained by subtracting a preset distance from the calculated distance between the positions of the two points is defined as a reducible range, and
the load range determining unit determines the reducible range as the load range when judgment is made that the reduced display process is to be performed.

8. The scrolling apparatus according to claim 1, wherein
the detector detects positions of two points specified by the user as the movement starting point in the operating range having a position that is specifiable by the user,
the load range determining unit calculates a distance between the positions of the two points detected by the detector and judges whether or not an enlarged display process is to be performed based on the calculated distance,
a range of the display data displayed on the display when the enlarged display process is performed by an amount in accordance with a value obtained by subtracting the calculated distance between the positions of the two points from a preset distance is defined as an enlargeable range, and
the load range determining unit determines the enlargeable range as the load range when judgment is made that the enlarged display process is to be performed.

9. A scrolling method of scrolling display contents of a display unit, the scrolling method comprising:
a detecting step of detecting a position of a movement starting point specified by a user in an operating range having a position that is specifiable by the user;
a load range determining step of determining, according to the position of the movement starting point detected in the detecting step, a load range, which is larger than a display range of the display, of display data to be loaded from a primary storage that stores display data to a secondary storage that stores the display data, among the display data stored in the primary storage;
a loading step of loading the display data in the load range determined in the load range determining step from the primary storage to the secondary storage; and
a displaying step of displaying on the display display data in the display range among the display data in the load range stored in the secondary storage,
wherein the load range determining step includes:
calculating a first distance between a position of a first edge point and the position of the movement starting point detected by the detecting step, the first edge point being an edge point of the operating range farthest from the movement starting point in a first direction;
calculating a second distance between a position of a second edge point and the position of the movement starting point detected by the detecting step, the second edge point being an edge point of the operating range farthest from the movement starting point in a second direction that differs from the first direction;
defining a direction corresponding to a longer distance of the first distance and the second distance as a predicted scrolling direction; and
judging that display data to be displayed on the display when the display contents are scrolled in the predicted scrolling direction among the display data in the load range has a high priority, and
wherein the loading step sequentially loads to the secondary storage display data starting from data judged to have a high priority by the load range determining step.

10. A non-transitory computer readable recording medium storing a scrolling program that enables scrolling of display contents of a display, the scrolling program being executed by a computer and causing the computer to function as:
a primary storage that stores display data;
a secondary storage that stores the display data in a load range that is larger than a display range of the display among the display data stored in the primary storage;
a load range determining unit that is electrically connected to the detector, the primary storage and the secondary storage, and determines the load range of the display data to be loaded from the primary storage to the secondary storage according to a position of a movement starting point specified by a user in an operating range having a position that is specifiable by the user;
a loading unit that is electrically connected to the load range determining unit, the primary storage and the secondary storage, and loads the display data in the load range determined by the load range determining unit from the primary storage to the secondary storage; and
a display control unit that is electrically connected to the display and the secondary storage, and displays on the display display data in the display range among the display data in the load range stored in the secondary storage,
wherein the load range determining unit is configured to:
calculate a first distance between a position of a first edge point and the position of the movement starting point detected by the detector, the first edge point being an edge point of the operating range farthest from the movement starting point in a first direction;
calculate a second distance between a position of a second edge point and the position of the movement starting point detected by the detector, the second edge point being an edge point of the operating range farthest from the movement starting point in a second direction that differs from the first direction;

define a direction corresponding to a longer distance of the first distance and the second distance as a predicted scrolling direction; and judge that display data to be displayed on the display when the display contents are scrolled in the predicted scrolling direction among the display data in the load range has a high priority, and wherein the loading unit sequentially loads to the secondary storage display data starting from data judged to have a high priority by the load range determining unit.

11. An integrated circuit that enables scrolling of display contents of a display, the integrated circuit comprising:

a load range determining circuit that determines, according to a position of a movement starting point specified by a user in an operating range having a position that is specifiable by the user, a load range, which is larger than a display range of the display, of display data to be loaded from a primary storage that stores display data to a secondary storage that stores the display data, among the display data stored in the primary storage;

a loading circuit that loads the display data in the load range determined by the load range determining circuit from the primary storage to the secondary storage; and a display control circuit that displays on the display display data in the display range among the display data in the load range stored in the secondary storage, wherein the load range determining circuit is configured to:

calculate a first distance between a position of a first edge point and the position of the movement starting point detected by the detecting circuit, the first edge point being an edge point of the operating range farthest from the movement starting point in a first direction;

calculate a second distance between a position of a second edge point and the position of the movement starting point detected by the detecting circuit, the second edge point being an edge point of the operating range farthest from the movement starting point in a second direction that differs from the first direction;

define a direction corresponding to a longer distance of the first distance and the second distance as a predicted scrolling direction; and judge that display data to be displayed on the display when the display contents are scrolled in the predicted scrolling direction among the display data in the load range was a high priority, and wherein the loading circuit sequentially loads to the secondary storage display data starting from the data judged to have a high priority by the load range determining circuit.

* * * * *